United States Patent
Pace et al.

(10) Patent No.: US 10,855,979 B2
(45) Date of Patent: Dec. 1, 2020

(54) INTERPRETING EYE GAZE DIRECTION AS USER INPUT TO NEAR-EYE-DISPLAY (NED) DEVICES FOR ENABLING HANDS FREE POSITIONING OF VIRTUAL ITEMS

(71) Applicant: MICROSOFT TECHNOLOGY LICENSING, LLC, Redmond, WA (US)

(72) Inventors: Maria Esther Pace, Palo Alto, CA (US); Sergio Ortiz Egea, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/383,498

(22) Filed: Apr. 12, 2019

(65) Prior Publication Data

US 2020/0128231 A1    Apr. 23, 2020

Related U.S. Application Data

(63) Continuation-in-part of application No. 16/168,319, filed on Oct. 23, 2018.

(51) Int. Cl.
*G06F 3/01* (2006.01)
*H04N 13/383* (2018.01)
*G06F 9/30* (2018.01)

(52) U.S. Cl.
CPC ........... *H04N 13/383* (2018.05); *G06F 3/013* (2013.01); *G06F 9/3004* (2013.01)

(58) Field of Classification Search
CPC ...... G06F 3/013; G06F 9/3004; H04N 13/383
See application file for complete search history.

(56) References Cited

U.S. PATENT DOCUMENTS

| 7,091,928 B2 | 8/2006 | Rajasingham |
| 9,075,453 B2 | 7/2015 | Bhaskar et al. |

(Continued)

FOREIGN PATENT DOCUMENTS

| EP | 2893388 A1 | 7/2015 |
| WO | 2013168171 A1 | 11/2013 |

(Continued)

OTHER PUBLICATIONS

"Non Final Office Action Issued in U.S. Appl. No. 16/168,319", dated Oct. 17, 2019, 11 pages.

(Continued)

*Primary Examiner* — Lisa S Landis
(74) *Attorney, Agent, or Firm* — Newport IP, LLC; Mike R. Cicero

(57) ABSTRACT

A Near-Eye-Display (NED) device utilizes eye tracking to interpret gaze direction as user input for hands free positioning of virtual items. The NED device includes an eye tracking system to monitor gaze direction and a display component that renders virtual items within a user's view of a physical real-world environment. The NED device receives an indication that the user desires to adjust a position of the virtual item. In response, the NED device uses tracks the user's eye movements to dynamically change the position at which the display component is rendering the virtual item. In this way, a NED device may identify when a user desires to adjust a position at which a virtual item is being rendered and then may enable the user to make the desired adjustments simply by "dragging" the virtual item with deliberate and controlled eye movements.

20 Claims, 19 Drawing Sheets

(56) References Cited

U.S. PATENT DOCUMENTS

| | | | |
|---|---|---|---|
| 9,299,183 | B2 | 3/2016 | Vesely |
| 9,335,547 | B2 | 5/2016 | Takano et al. |
| 9,507,426 | B2 | 11/2016 | Raffle |
| 9,514,538 | B2 | 12/2016 | Ebisawa |
| 9,766,463 | B2 | 9/2017 | Border et al. |
| 9,952,665 | B2 | 4/2018 | Di Censo et al. |
| 10,067,561 | B2 | 9/2018 | San Agustin Lopez |
| 2006/0250322 | A1 | 11/2006 | Hall et al. |
| 2013/0050432 | A1 | 2/2013 | Perez et al. |
| 2013/0050833 | A1 | 2/2013 | Lewis et al. |
| 2013/0083003 | A1 | 4/2013 | Perez et al. |
| 2013/0241805 | A1 | 9/2013 | Gomez |
| 2014/0285404 | A1 | 9/2014 | Takano et al. |
| 2015/0097772 | A1 | 4/2015 | Starner |
| 2015/0262424 | A1 | 9/2015 | Tabaka et al. |
| 2015/0301599 | A1 | 10/2015 | Miller |
| 2015/0309568 | A1 | 10/2015 | Miki |
| 2016/0025971 | A1* | 1/2016 | Crow ............ G02B 27/0093 345/156 |
| 2016/0203359 | A1 | 7/2016 | Von Und Zu Liechtenstein |
| 2016/0225153 | A1 | 8/2016 | Kim |
| 2017/0069135 | A1 | 3/2017 | Komaki et al. |
| 2017/0108697 | A1 | 4/2017 | El-ghoroury et al. |
| 2017/0123492 | A1* | 5/2017 | Marggraff ........ G06F 3/04886 |
| 2018/0300952 | A1 | 10/2018 | Evans et al. |
| 2018/0350145 | A1* | 12/2018 | Byl .................. G06T 19/006 |
| 2020/0125165 | A1 | 4/2020 | Pace et al. |

FOREIGN PATENT DOCUMENTS

| | | |
|---|---|---|
| WO | 2014205422 A2 | 12/2014 |
| WO | 2015013022 A1 | 1/2015 |

OTHER PUBLICATIONS

"International Search Report and Written Opinion Issued in PCT Application No. PCT/US2019/055280", dated Feb. 27, 2020, 10 Pages.

"International Search Report and Written Opinion Issued in PCT Application No. PCT/US19/054911", dated Jan. 31, 2020, 10 Pages.

"International Search Report and Written Opinion Issued in PCT Application No. PCT/US19/054912", dated Feb. 6, 2020, 11 Pages.

"International Search Report and Written Opinion Issued in PCT Application No. PCT/US19/055279", dated Jan. 28, 2020, 12 Pages.

"International Search Report and Written Opinion Issued in PCT Application No. PCT/US19/055749", dated Feb. 4, 2020, 12 Pages.

"Non Final Office Action Issued in U.S. Appl. No. 16/383,474", dated Apr. 9, 2020, 15 Pages.

* cited by examiner

INTERPRETING EYE GAZE DIRECTION AS USER INPUT TO NEAR-EYE-DISPLAY (NED) DEVICES FOR ENABLING HANDS FREE POSITIONING OF VIRTUAL ITEMS

PRIORITY APPLICATION

This U.S. non-provisional application is a continuation in part application that claims benefit of and priority to U.S. Non-Provisional application Ser. No. 16/168,319, filed Oct. 23, 2018, entitled EYE TRACKING SYSTEMS AND METHODS FOR NEAR-EYE-DISPLAY (NED) DEVICES, the entire contents of which are incorporated herein by reference.

BACKGROUND

Near-Eye-Display (NED) devices provide tools for augmenting a physical real-world environment with virtually rendered information to enable people to collaboratively tackle a variety of tasks within the physical real-world environment. For example, some NED devices enable users to place virtual notes or even three-dimensional (3D) virtual objects within the physical real-world environment. In this way, users can deliberately position virtual items (e.g., notes or objects) to provide environmental context for the virtual items with respect to the physical real-world environmental. As a specific example, a user that is wearing a NED device while inspecting an industrial machine may deliberately position virtual notes adjacent to specific issues (e.g., cracks, corrosion, etc.) that are identified during the inspection. It can be appreciated that the deliberate placement of the items serves as a positional flag of where persons should focus their attention with respect to certain virtual items.

Some conventional NED devices track users' hand movements in order to identify various hand gestures that are usable to control a position of virtual items. For example, while wearing a conventional NED device, a user may make an "pinch" gesture to grab a virtual item. Then, while retaining the "pinch" gesture the user may deliberately adjust the position of the virtual item. Unfortunately, in some scenarios a user may desire to deliberately position an item in virtual space while holding a tool or while otherwise being restricted from performing hand gestures. Thus, conventional NED devices are ill-suited for enabling a user to control virtual item positioning under circumstances where the user is unable to perform hand gestures.

It is with respect to these and other considerations that the disclosure made herein is presented.

SUMMARY

Technologies described herein provide for Near-Eye-Display (NED) devices that utilize eye tracking systems to interpret a user's gaze direction as user input for hands free positioning of virtual items. Generally described, an exemplary NED device includes an eye tracking system to monitor a user's gaze direction and a display component that renders computer-generated virtual items within the user's view of a physical real-world environment. Exemplary virtual items include, but are not limited to, virtual notes or three-dimensional (3D) virtual objects that may be anchored at various positions within 3D space. In some embodiments, the NED device receives an indication that a user desires to adjust a position of a virtual item that is being rendered by the NED device. After receiving this indication, the NED device then uses the eye tracking system to track the user's eye movements and, in response to the user's eye movements, to dynamically change the position at which the display component is rendering the virtual item. The indication that the user desires to adjust the position of the virtual item may be, for example, a voice command that is audibly spoken by the user, a facial gesture that is performed by the user, or any other suitable indication. In this way, a NED device may identify when a user desires to adjust a position at which a virtual item is being rendered and then may enable the user to make the desired adjustments simply by "dragging" the virtual item with deliberate and controlled eye movements.

As a specific example, a user that is wearing a NED device as described herein may adjust their gaze direction to controllably place a cursor on top of a virtual item. The user may then close a single eye to "pinch" or "grab" the virtual item in a manner that is analogous to holding down a left-mouse button to hold onto an item such as a folder or file in a conventional operating system. Next, while the eye remains closed to retain the "pinch" or "grab" on the virtual item, the user may move the virtual item in 3D space simply by changing the gaze direction of the eye that remains open. In this example, the user is enabled to control virtual item positioning without needing to use hand gestures or user input devices such as keyboards, wands, etc.

Technologies described herein provide a marked improvement over conventional NED devices in that users are enabled to refine the positions at which virtual items are rendered without having to perform hand gestures or having to utilize dedicated input devices. Real-life practical applications of these technologies include scenarios where users desire to place virtual items within a real-world environment while performing hand intensive tasks that render conventional hand gestures impractical. For example, a user may be inspecting a piece of industrial machinery and, in doing so, may be utilize various inspection tools. Using the techniques described herein, the user may inspect some portion of the industrial machinery and then generate and position notes about the inspection results without having to set down the inspection tools.

In an exemplary embodiment, a Near-Eye-Display (NED) device includes an eye tracking system having one or more sensors that generate eye tracking data that indicates a gaze direction (e.g., as defined by a visual axis or an optical axis) of one or both of a user's eyes. The NED device also includes a display component that renders virtual items within the user's field-of-view. In accordance with the techniques described herein, the NED device receives an indication of when the user wishes to adjust a position of various ones of the virtual items. For example, the user may direct his or her eye gaze onto a particular virtual object and then hold closed a single eye to "grab" the particular virtual object. As another example, the user may provide an audible command such as "Drag the Virtual Item." The NED device then uses the eye tracking system to track the user's gaze direction and to dynamically match the the position of the virtual item to align with the user's changing gaze direction. For example, the NED device may correlate (e.g., match) the user's gaze direction to a point within a real-world coordinate system to which the virtual item is anchored. In this way, the user can drag a virtual item so that it is adjacent to an object that exists within the real-world environment (e.g., a crack within a pipe on an industrial machine). Then, the virtual item remains static with respect to the object. For example, if a user uses their eye gaze to "drag-and-drop" a virtual comment bubble adjacent to a crack in the industrial machine pipe, then the virtual comment bubble will remain adjacent to the crack—even if the user who placed it leaves and/or other users approach it.

It will be appreciated that the gaze direction of the user can in a way be analogized to a mouse cursor element of a typical operating system. For example, the user focusing on a specific virtual item may be treated similar to the user hovering a mouse cursor over the specific virtual item. Then, the user may somehow "grab" the specific virtual item by, for example, deliberately performing some facial gesture that is assigned to a "grab" functionality that is similar to holding a left-click on a standard mouse. Then, the user can move the virtual item around simply be adjusting his or her gaze direction—just as could be done by moving an optical computer mouse around on a desktop and/or mousepad.

In some embodiments, the NED device may monitor for one or more predetermined facial gestures such as, for example, a user shutting a left eye while a right eye remains open, the user shutting the right eye while the left eye remains open, the user blinking a single eye or both eyes concurrently while focused on an item he or she intends to drag, or any other suitable facial gesture that a typical user may deliberately perform for purposes of providing an indication to the NED device that the user intends to adjust a position of a virtual item within 3D space. In this way, the NED device identifies combinations of user gaze direction and predetermined facial gestures and, ultimately, interprets these identified combinations as user input instructions associated with controllably repositioning virtual items.

In the exemplary embodiment, the NED device may utilize the display to render one or more computer-generated images within at least a portion of the user's field-of-view (FOV). For example, the NED device may render a virtual comment bubble within the user's FOV. The virtual comment bubble may include a text field into which the user is able to dictate notes. The virtual comment bubble may also be anchored to a point in 3D space based on a coordinate system. The coordinate system may be static with respect to the physical real-world environment (e.g., based on GPS coordinates, based on a geometric feature of a point cloud representation of the physical real-world environment). As a specific but non-limiting example, the user may decide to generate a new virtual comment bubble in relation to a particular object that exists within the real-world environment. In some implementations, the user may do so by performing some predetermined facial gesture. For example, the user may quickly and deliberately blink both eyes three times within two seconds and the NED device may interpret this facial gesture as an instruction to generate a new virtual comment bubble. Initially, the newly created virtual comment bubble may be located at some predetermined default location (e.g., centered within the user's field of view and two meters out from the NED device). Then, the user may reposition and anchor the newly created virtual comment bubble by attaching their eye gaze to the newly created virtual comment bubble (e.g., by holding shut one eye to perform a "grab" facial gesture) and then deliberately adjusting his or her gaze direction. Then, once the virtual comment bubble is located as desired, the user may detach their eye gaze from the virtual comment bubble so as to leave the virtual comment bubble at its newly defined position. A benefit of the techniques described herein is that a user whom is wearing the NED device is enabled to provide "hands-free" user input instructions to "drag-and-drop" virtual items simply by gazing at the virtual items and then deliberately performing some predefined facial gesture while changing their eye gaze to drag the virtual items.

With respect to a non-limiting but exemplary technique for monitoring gaze direction (e.g., to determine where a user intends to drag a virtual item), the eye tracking data may be associated with one or more substantially circular features of one or both of a user's eyes. Exemplary such "substantially" circular features include pupils and irises which are generally very close to circular and, therefore, may be modeled as perfect circles for purposes of the calculations described herein. In one eye tracking system, individual sensors have corresponding sensor planes that are angularly skewed with respect to the planes on which the circular features reside (e.g., an Iris-Pupil Plane). Based on the eye tracking data, the eye tracking system determines ellipse parameters for ellipses that result from these sensor planes being angularly skewed from the Iris-Pupil Planes. In some embodiments, the eye tracking system may track only one of the user's eyes. In other embodiments, the eye tracking system may track both of the user's eyes. In embodiments that track both eyes, the eye tracking system may determine ellipse parameters that define: (i) first ellipses that correspond to projections of an iris and/or pupil of a right eye onto a first sensor plane; and (ii) second ellipses that correspond to projections of an iris and/or pupil of a left eye onto a second sensor plane. The projections of each of the iris(es) and/or pupil(s) onto the corresponding sensor plane(s) may in some embodiments pass through a predetermined point such as, for example, an entrance pupil of each corresponding sensor.

Based on the ellipse parameters, the eye tracking system may then generate propagation data that defines three-dimensional (3D) propagations of the ellipses. The 3D propagation data may define a series of lines (e.g., rays) that extend from individual ellipses that are detected on the sensor plane. For example, individual lines of the series of lines may begin on the sensor plane at individual points along a perimeter of a detected ellipse. The individual lines may all commonly propagate from the sensor plane through a predetermined point toward the user's eyes. In some implementations, the predetermined point through which all lines of a particular 3D propagation pass is an entrance pupil of a corresponding sensor. Since all of the lines of these 3D propagations extend from the ellipse through the predetermined point, the 3D propagations may be graphically represented as an elliptic cone that extends from the predetermined point toward the eye.

The eye tracking system may utilize the propagation data to determine pupil orientation parameters that define various characteristics of the user's eye(s). Exemplary pupil orientation parameters may define optical axes for one or both of the user's eyes (e.g., an axis of an eye lens), visual axes for one or both of the user's eyes (e.g. axes that extend from the fovea through the lens and into the real-world environment), rotational angles of the user's eyes (e.g. an angle of rotation between a semi-axis of an ellipse and a horizontal axes of the sensor), Iris-Pupil Planes of the user's eyes (e.g. a plane on which the pupil resides), center points for the user's eyes (e.g., a point at which the optical axis (or alternatively the visual axis) intersects the Iris-Pupil plane). Additionally, or alternatively, the pupil orientation parameters may define various other characteristics of the user's eyes.

As described in detail below, the eye tracking system may utilize the pupil orientation parameters to continually determine a current (e.g., real time) IPD for a user, i.e. while the NED device is operating. For example, the eye tracking system may dynamically track the center points for each of the user's two eyes and continually calculate and re-calculate the user's interpupillary distance in near real time.

Additionally, or alternatively, the eye tracking system may utilize the pupil orientation parameters to determine a vergence of two visual axes (which are different than the optical axis) of the user. For example, the eye tracking system may dynamically track the visual axis of each of the user's two eyes and continually calculate a location in space at which the distance between these two visual axes is the smallest. In various implementations, the visual axes are determined based on visual axis offset data that indicates at least an angular relationship between the optical axis and the visual axis. As described in detail below, this visual axis offset data may be specifically custom to a particular user and may be determined through a user-specific calibration process. It can be appreciated that although vergence is generally understood as the "point" at which the user's two visual axis intersect, in a practical sense these axes rarely mathematically intersect but rather simply become the closest at the user's accommodation plane. Thus, as described herein the vergence of the visual axes may be determined by calculating a point in space at which the separation between the two visual axes is the least (i.e., wherever the two axes become closest together).

In some embodiments, the pupil orientation parameters may be determined by analyzing the propagation data with respect to an ocular rotation model to calculate an orientation of the Iris-pupil plane for an eye, a distance from a predetermined point of the sensor to a center of an entrance pupil of the eye, and/or a radius of the pupil of the eye. The ocular rotation model may be usable to model rotation of a circular feature of an eye around that eye's center of rotation. For example, the ocular rotation model may be (or be based on) an equation that defines coordinates for a circle of a particular radius as that circle is rotated around the center of an eye. It can be appreciated that a circle of a specific radius will mathematically match the "elliptical" 3D propagations only at a single plane. Therefore, utilizing various error minimization algorithms to analyze the propagation data with respect to the ocular rotation model may yield the Iris-Pupil plane's specific location in space and the circular pupil's specific location and rotation thereon. Although some specific error minimization algorithms are described herein, such descriptions are provided for exemplary purposes only and other error minimization algorithms may also be used.

Although exemplary and non-limiting, the foregoing techniques provide for highly accurate monitoring of gaze direction and are suitable for tracking a user's gaze direction to determine where the user intends to position a virtual item within 3D space. Moreover, since the substantially circular feature that is being tracked in the foregoing techniques will become obstructed by the user's eyelid while a blink is being performed, the foregoing techniques are also suitable for monitoring for certain types of predetermined facial gestures such as when a user is holding an eye shut as a gesture to "pinch" or "grab" a virtual item. Thus, such techniques may be used by the exemplary NED device to both identify when the user desires to reposition a virtual item and to determine where the user wishes to drag the virtual item to in virtual space—all without requiring hand gestures or other hand-based user inputs.

It should be appreciated that any reference to "first," "second," etc. items and/or abstract concepts within the Summary and/or Detailed Description is not intended to and should not be construed to necessarily correspond to any reference of "first," "second," etc. elements of the claims. In particular, within the Summary and/or Detailed Description, items and/or abstract concepts such as, for example, three-dimensional (3D) propagations and/or circular features of eyes and/or sensor entrance pupils may be distinguished by numerical designations without such designations corresponding to the claims or even other paragraphs of the Summary and/or Detailed Description. For example, any designation of a "first 3D propagation" and "second 3D propagation" of the eye tracking system within any specific paragraph of this the Summary and/or Detailed Description is used solely to distinguish two different 3D propagations of the eye tracking system within that specific paragraph—not any other paragraph and particularly not the claims.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

DETAILED DESCRIPTION

Figure 1:
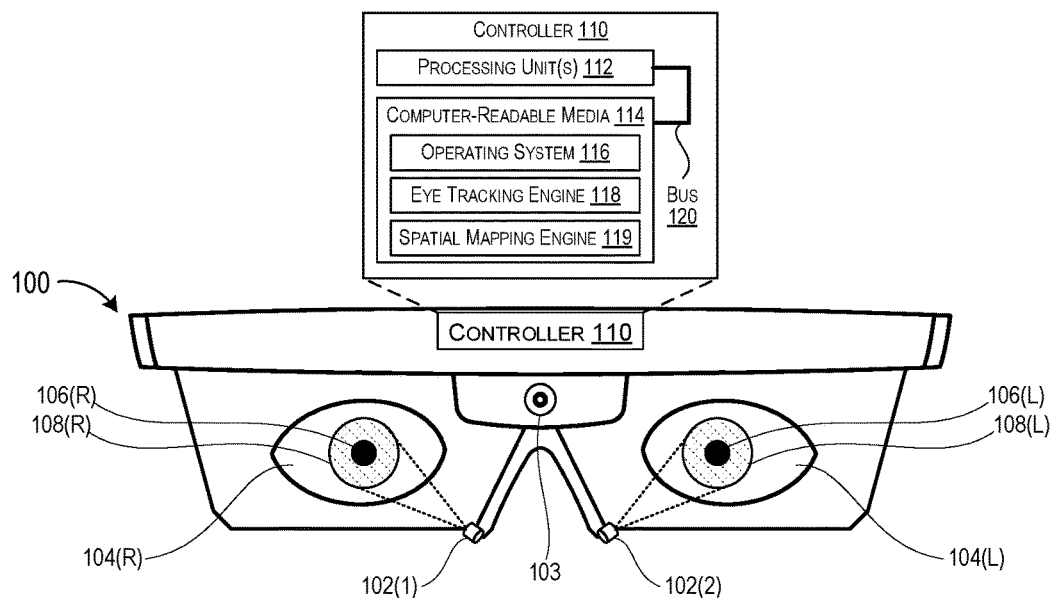
FIG. 1 illustrates an exemplary hardware layout for a Near-Eye-Display (NED) device that is configured to implement the methods described herein.

The following Detailed Description describes technologies for enabling Near-Eye-Display (NED) devices to interpret a user's gaze direction as user input for hands free positioning of virtual items within three-dimensional (3D) space. An exemplary NED device for implementing these technologies includes an eye tracking system to monitor a user's gaze direction and a display component that renders computer-generated virtual items within the user's field-of-view. The exemplary NED device may receive an indication that a user desires to adjust a position of a virtual item that is being rendered by the NED device. Additionally, or alternatively, the exemplary NED device may receive an indication that a user desires to define a position to render a virtual item that is not yet being rendered by the NED device. After receiving this indication, the NED device may use the eye tracking system to track the user's eye movements to determine where to render the virtual item of interest. In scenarios in which the virtual item is already being rendered when the indication is received, the NED device may respond to the user's eye movements by dynamically changing the position at which the virtual item is being rendered by the display component. For example, the position at which the virtual item is being rendered may track the user's gaze direction. In various implementation, the indication that the user desires to adjust the position of the virtual item may be, for example, a voice command that is audibly spoken by the user, a facial gesture that is performed by the user, or any other suitable indication. In this way, a NED device may identify when a user desires to adjust a position at which a virtual item is being rendered and then may enable the user to make the desired adjustments simply by "dragging" the virtual item with deliberate and controlled eye movements.

As a specific example, a user that is wearing a NED device may be within the vicinity of a real object (e.g., an industrial machine) that exists within a physical real-world environment (e.g., a manufacturing facility). The NED device may be utilizing a spatial mapping engine to generate spatial mapping data that defines geometric characteristics of various real objects (e.g., floors, stairs, walls, chairs, industrial machines, tools, etc.) that exist within the physical real-world environment. As used herein, the term spatial mapping generally refers to the generation of a 3D map of a real environment. It can be appreciated that spatial mapping data may come in a variety of forms such as, for example, a representation of real-world geometry as one or more triangular meshes of interconnected vertices. Applications being executed by the NED device may use spatial mapping data for a variety of reasons that include, but are not limited to, causing a virtual item to occlude a real object, causing a virtual item to be occluded by a real object, or causing a virtual item to remain statically placed with respect to a real object. The NED device may be rendering a virtual item to augment the user's view of the physical real-world environment.

Continuing with this specific example, the user may then decide to adjust the position of the virtual item so that it becomes anchored to the real object—which is represented in the spatial mapping data. In some implementations, the user may do so by adjusting his or her gaze direction toward the virtual item and then closing a single eye to "hold" the virtual item in a manner that is analogous to holding down a left-mouse button to hold onto an item in a conventional operating system. Next, while the eye remains closed to retain the "hold" on the virtual item, the user may move the virtual item in 3D space simply by changing the gaze direction of the eye that remains open. For example, the user may adjust or pan his or her gaze direction to be directed at the real object to which virtual item is to become anchored. Here, the NED device may determine that the user intends to anchor the virtual item to the real object based on the user's gaze direction intersecting with a portion of a spatial map that corresponds to the virtual item. Then, the NED device may anchor the virtual item to the real object based on a coordinate system that is associated with the spatial mapping data. In this example, the user is enabled to control virtual item positioning and to anchor virtual items to real objects without needing to use hand gestures or user input devices such as keyboards, wands, etc. Then, as the user (or other users wearing NED devices for that matter) moves around with respect to the real object, the virtual item remains pinned thereto.

Technologies described herein provide a marked improvement over conventional NED devices in that users are enabled to refine the positions at which virtual items are rendered without having to perform hand gestures or having to utilize dedicated input devices. Real-life practical applications of these technologies include scenarios where users desire to place virtual items within a real-world environment while performing hand intensive tasks that render conventional hand gestures impractical. For example, a user may be inspecting a piece of industrial machinery and, in doing so, may be utilize various inspection tools. Using the techniques described herein, the user may inspect some portion of the industrial machinery and then generate and position notes about the inspection results without having to set down the inspection tools.

Aspects of the techniques described herein are primarily described in the context of a specific scenario where a person is inspecting a piece of industrial machinery and desires to anchor a virtual comment bubble to some portion of the industrial machinery without performing hand gestures. While the disclosed techniques are not necessarily limited to such a scenario, an appreciation of various aspects of the invention is best gained through a discussion of an example in such a context. However, the techniques described herein applicable to a variety of other contexts. Various techniques described herein are extendable to facilitate "hand-free" user input instructions in any other suitable context.

Turning now to FIG. 1, illustrated is an exemplary hardware layout for a Near-Eye-Display (NED) device 100 that is configured to implement the methods described herein. In the exemplary hardware layout, the NED device 100 includes a pair of eye tracking sensors 102 that are each directed toward a corresponding eye 104 of a user. More specifically, the illustrated NED device 100 includes a first eye tracking sensor 102(1) that is angularly offset from and directed toward a right eye 104(R) and also a second eye tracking sensor 102(1) that is angularly offset from and directed toward a left eye 104(L). The right eye 104(R) includes a corresponding pupil 106(R) and a corresponding iris 108(R). The left eye 104(L) includes a corresponding pupil 106(L) and a corresponding iris 108(L). The eye tracking sensors 102 can be in any suitable form such as, for example, a non-contact sensor configured to use optical-based tracking (e.g. video camera based and/or some other specially designed optical-sensor-based eye tracking technique) to monitor the one or more physical characteristics of the user's eyes. Exemplary physical characteristics include, but are not limited to, pupil size, a rate of change of pupil size, gaze direction, and/or a rate of change to a gaze direction.

FIG. 1 is illustrated from a perspective that is directly in front of the optical axes of the eyes 104 so that the pupils 106 and irises 108 appear perfectly circular. It will be appreciated by one skilled in the art that in humans (and many other vertebrates for that matter) the pupils 106 and irises 108 of the eyes 104 are almost perfect circles. Therefore, in various calculations described below, the pupils 106 and/or irises 108 are mathematically modeled as and/or presumed to be perfectly circular in shape. From the perspective of the individual eye tracking sensors 102, however, the pupils 106 and irises 108 of the eyes 104 appear to be elliptical as described herein. This is because the eye tracking sensors 102 are angularly offset from the eyes 104 in the sense that the optical axis of each individual eye tracking sensor 102 is not parallel to the optical axis of the eye 104 it is tracking. The position of the eye tracking sensors 102 shown in FIG. 1 is for illustrative purposes only. It will be appreciated that the techniques described herein can be performed with the eye tracking sensors 102 being located in a variety of positions with respect to the eyes. As a specific but nonlimiting example, the sensors could be embedded within a lens or other substrate directly in front of the eyes.

In the exemplary hardware layout, the NED device 100 also includes one or more spatial mapping sensors 103 that are directed outward from the NED device 100 toward a real-world environment. Exemplary spatial mapping sensors include, but are not limited to, structured infrared light projector and scanner assemblies, time-of-flight cameras, RBG Depth cameras, and any other technology suitable for generating spatial mapping data that defines geometric characteristics of various real objects (e.g., floors, stairs, walls, chairs, industrial machines, tools, etc.) that exist within the physical real-world environment. As used herein, the term spatial mapping generally refers to the generation of a 3D map of a real environment such as, for example, a 3D triangular mesh of interconnected vertices—which may be points within a depth map.

In the illustrated embodiment, the NED device 100 further includes a controller 110 that is configured to implement the various operations of the methods described herein. The controller 110 may be communicatively coupled to the eye tracking sensors 102 to receive eye tracking data that is generated by the eye tracking sensors 102 in association with the circular features of the eyes. The controller 110 may further be communicatively coupled to other componentry of the NED display device 100. The controller 110 includes one or more logic devices and one or more computer memory devices storing instructions executable by the logic device(s) to deploy functionalities described herein with relation to the NED device 100. The controller 116 can comprise one or more processing units 112, one or more computer-readable media 114 for storing an operating system 116 and data such as, for example, eye tracking data, visual axis offset data, application data, etc. The controller 110 may further include an eye tracking engine 118 configured to receive the eye tracking data from the eye tracking sensor 102 and, based thereon, determine one or more physical characteristics of the user's eyes using the methods and techniques described herein. The components of the NED device 100 are operatively connected, for example, via a bus 120, which can include one or more of a system bus, a data bus, an address bus, a PCI bus, a Mini-PCI bus, and any variety of local, peripheral, and/or independent buses.

In some embodiments, the controller 110 may further include a spatial mapping engine 119 that is configured to receive data from the one or more spatial mapping sensors 103 for generating spatial mapping data that provides a representation of real-world surfaces around the NED device 100. Spatial mapping functionality is provided in some NED device platforms such as HOLOLENS by MICROSOFT of Redmond, Wash. This functionality can be used by application developers in a variety of contexts to make applications environmentally aware. NED applications use spatial mapping data for a variety of reasons that include, for example, causing a virtual item to occlude a real object, causing a virtual item to be occluded by a real object, or causing a virtual item to remain statically placed with respect to a real object.

The processing unit(s) 112, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, computer-readable media, such as computer-readable media 114, can store instructions executable by the processing unit(s). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The NED device 100 may further include various other components, for example speakers, microphones, accelerometers, gyroscopes, magnetometers, temperature sensors, touch sensors, biometric sensors, other image sensors, energy-storage components (e.g. battery), a communication facility, a GPS receiver, etc.

Figure 2:
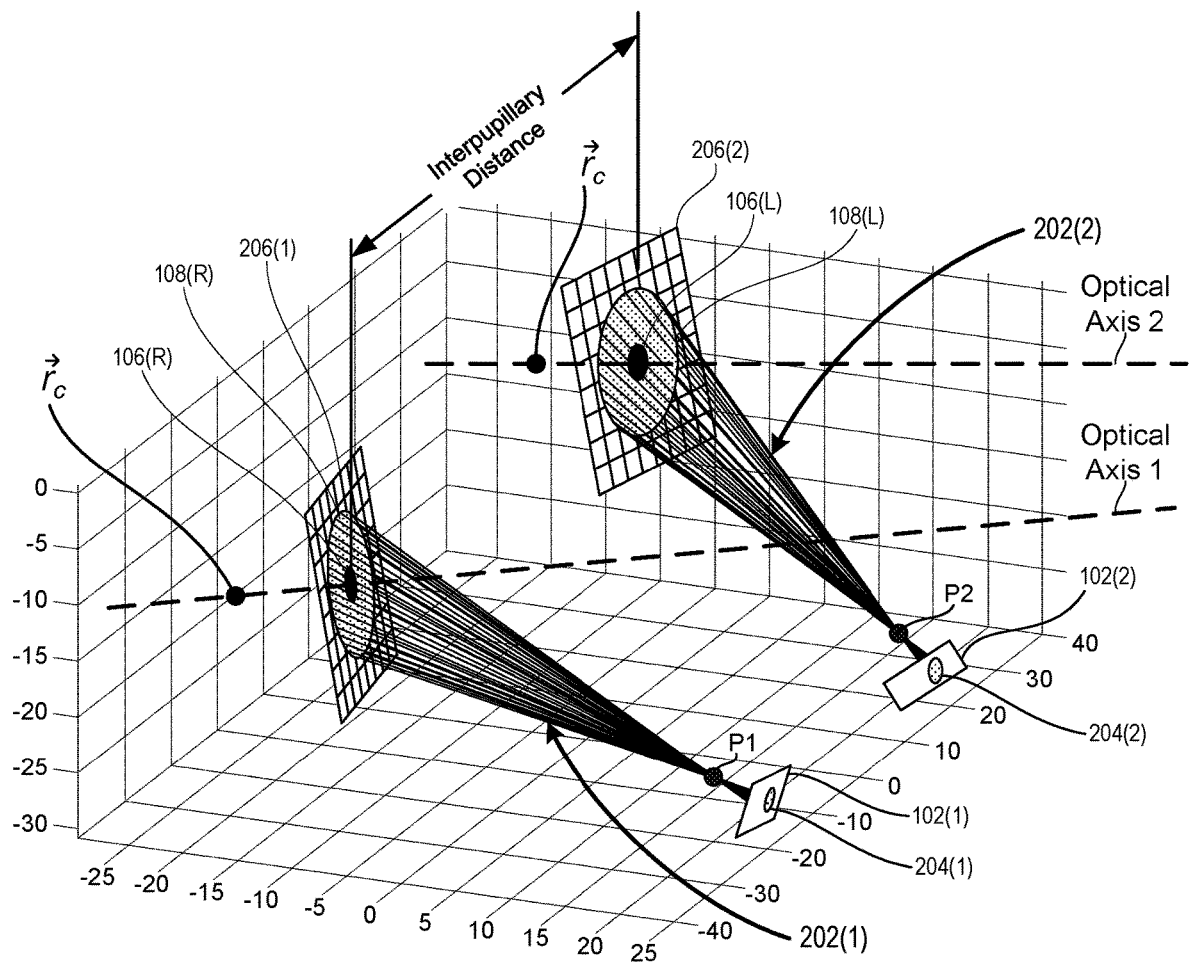
FIG. 2 illustrates a pair of three-dimensional (3D) propagations that extend from ellipses that result from circular features of user's eyes being projected into the sensors.

Turning now to FIG. 2, illustrated is a pair of three-dimensional (3D) propagations 202 that extend from ellipses 204 that result from circular features (e.g., pupils 106 and/or irises 108) of user's eyes 104 being projected into the eye tracking sensors 102. As illustrated, a first 3D propagation 202(1) extends from a first ellipse 204(1), which is detected at the first eye tracking sensor 102(1), through a first point P1. As further illustrated, a second 3D propagation 202(2) extends from a second ellipse 204(2), which is detected at the second eye tracking sensor 102(2), through a second point P2. Each of the 3D propagations 202 extend toward a corresponding Iris-Pupil plane 206 that is angularly offset with respect to the eye tracking sensors 102. The angularly offset nature of the Iris-Pupil planes 206 results in the pupils 106 and irises 108 appearing elliptical from the perspectives of the eye tracking sensors 102.

As illustrated, each of the individual 3D propagations 202 may include a series of lines that extend from a perimeter of a corresponding individual ellipse 204 through a corresponding predetermined point and, ultimately, to the perimeter of a circular feature (e.g., pupil 106 or iris 108) that resides within a corresponding Iris-Pupil plane 206. The predetermined points (e.g., P1 and P2) may correspond to specific points in space that are measurable in relation to corresponding eye tracking sensors 102. For example, the first predetermined point P1 may correspond to a center of an entrance pupil of the first eye tracking sensor 102(1) whereas the second predetermined point P2 may correspond to a center of an entrance pupil of the second eye tracking sensor 102(2). Thus, it can be appreciated that P1 may correspond to a point in space at which light rays cross prior to forming an image within the first eye tracking sensor 102(1) and that P2 may correspond to a point in space at which light rays cross prior to forming an image within the second eye tracking sensor 102(2).

As described in more detail below, these 3D propagations 202 may be used to determine pupil orientation parameters that define various characteristics of the user's pupil(s) 106. For example, it can be appreciated that the 3D propagations 202 can be mathematically modeled as elliptical cones. This is because individual ones of the 3D propagations 202 originate at a corresponding ellipse 204 and pass through a singular point. It can further be appreciated that a cross-section of an elliptical cone will be circular in shape if that cross-section is taken at a specific orientation. Thus, by using the mathematical assumption that the pupils 106 and irises 108 are circular in shape, the 3D propagations 202 may enable a determination of the specific orientation of the Iris-Pupil planes 206. Additionally, as described in more detail below, performing various error minimization techniques of the 3D propagations with respect to an ocular rotation model may further enable a determination of the center points of the pupils 106. It can be appreciated that once the location in space of the center point of a pupil 106 and an orientation of an Iris-Pupil plane 206 is known for a particular eye, the optical axis (illustrated as dashed lines for each eye) for that particular eye is also known.

Figure 3:
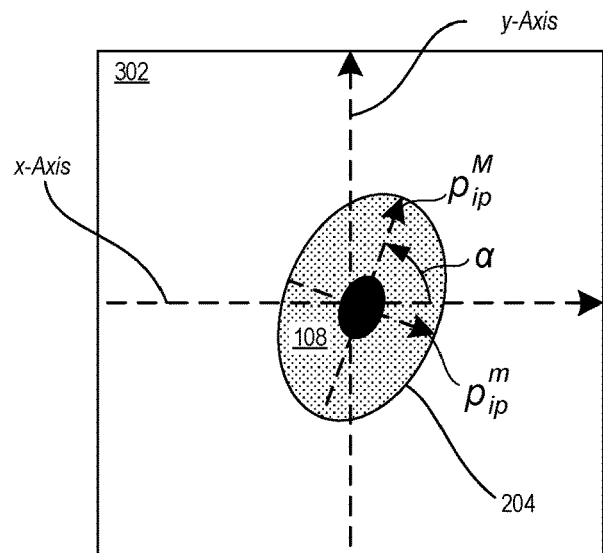
FIG. 3 illustrates in an exemplary ellipse that is being projected onto a sensor plane within a sensor that is angularly skewed with respect to the Iris-Pupil plane (not shown in FIG. 3) so that circular features on the Iris-Pupil plane appear elliptical on the sensor plane.

Turning now to FIG. 3, illustrated in an exemplary ellipse 204 that is projected from a circular feature of an eye 104 (e.g., an Iris 108) onto a sensor plane 302 of an eye tracking sensor 102. The sensor plane 302 may correspond to a substantially planar surface within the eye tracking sensor 102 that is angularly skewed with respect to a corresponding Iris-Pupil plane 206 (not shown in FIG. 3) so that circular features on the Iris-Pupil plane appear elliptical on the sensor plane 302. In some embodiments, the eye tracking sensors 102 may be image sensors such as, for example, complementary metal oxide semiconductor (CMOS) sensors and/or charge-coupled device (CCD) sensors. In such embodiments, the eye tracking sensors 102 may generate eye tracking data in the form of pixel data that defines images of the eyes. These images may be formed based on ambient light surrounding the user. Thus, in contrast to conventional eye tracking systems that rely on illuminating the eye(s) with near infrared light to cause first Purkinje reflections (e.g., "glints") that are distributed around the iris, the techniques disclosed herein do not require active emission of near infrared light toward the user's eyes. The numerous benefits of the techniques disclosed herein include providing a system that can track the user's eyes using ambient light rather than having to expend battery resources to generate near infrared light. Moreover, the disclosed techniques provide a system that is highly sensitive and accurate in the detection of eye movements (e.g., the systems are sensitive enough to even accurately track saccadic eye movements).

Semi-axes for the "elliptically shaped" iris 108 and/or pupil 106 are uniquely oriented within the sensor plane 302 for any particular subtended angle of the eye tracking sensor 102 and rotation of the eye being tracked. The size of the semi axes of the elliptically shaped iris 108 and pupil 106 depend on the original size of each and any magnification caused by optical components (e.g., lenses, etc.) of the eye tracking sensor 102. In FIG. 3, the semi-major axis of the elliptically shaped iris 108 is labelled $p_{ip}^{M}$ and the semi-minor axis of the elliptically shaped iris 108 is labelled $p_{ip}^{m}$. The sensor plane 302 is illustrated with a sensor coordinate system centered thereon. The sensor coordinate system includes a vertical y-Axis and a horizontal x-Axis. Additionally, as illustrated, the elliptically shaped iris 108 is rotated an angle $\alpha$ with respect to the horizontal x-Axis. Therefore, within the sensor plane 302, an ellipse 204 that is centered at ($\bar{x}_{ip}^{d}$, $\bar{y}_{ip}^{d}$) with semi-major axis $p_{ip}^{M}$ and semi-minor axis $p_{ip}^{m}$ and that is also rotated an angle $\alpha$ with respect to the horizontal x-Axis is given by Equation 1 shown below:

$$E_{ip}(i,j) \equiv \{\bar{x}_{ip}^{d} + p_{ip}^{M} \cos[\varphi(i,j)]\cos(\alpha) - p_{ip}^{m} \sin[\varphi(i,j)]\sin(\alpha), \bar{y}_{ip}^{d} + p_{ip}^{M} \cos[\varphi(i,j)]\sin(\alpha) - p_{ip}^{m} \sin[\varphi(i,j)]\cos(\alpha)\} \quad (1)$$

Figure 4:
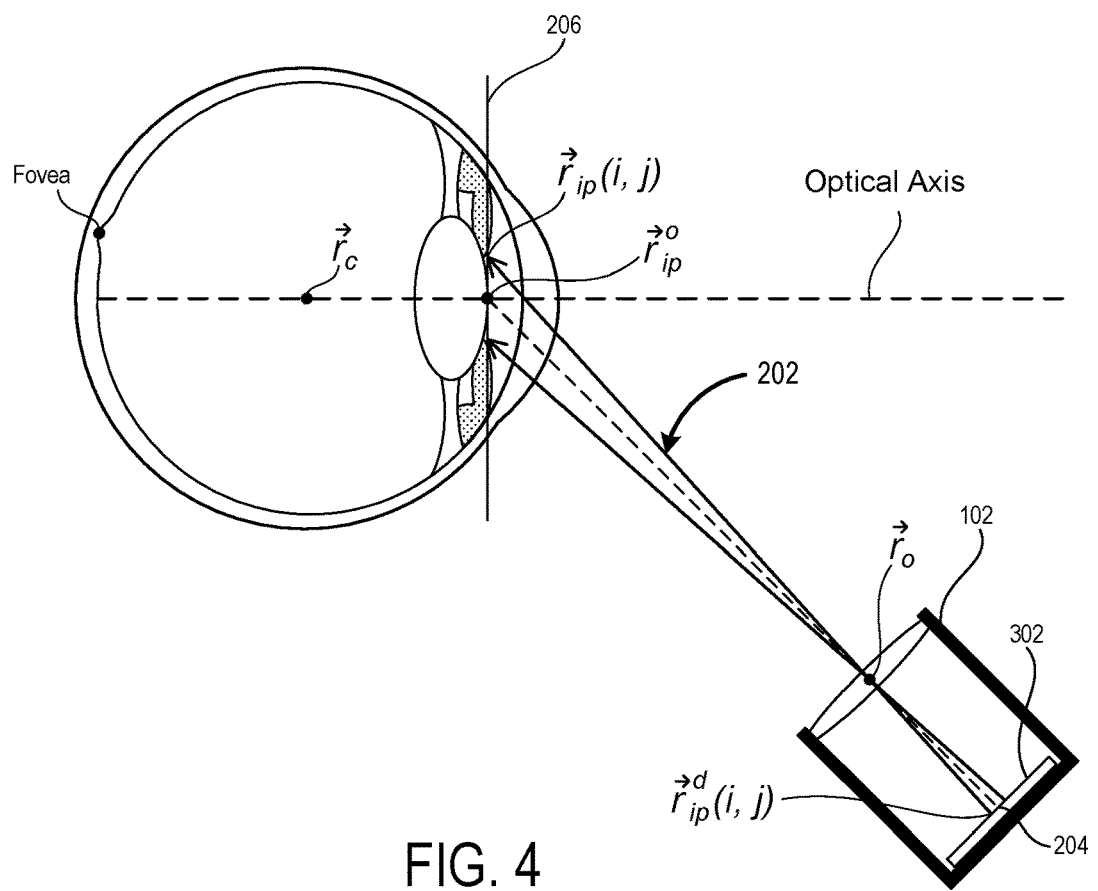
FIG. 4 illustrates a side view of a 3D propagation of the ellipse of FIG. 3 from the sensor plane through a predetermined point and toward the Iris-Pupil plane.

Turning now to FIG. 4, illustrated is a side view of a 3D propagation 202 of the ellipse 204 of FIG. 3 from the sensor plane 302 through a predetermined point. In the illustrated embodiment, the predetermined point is labeled $\vec{r}_{o}$ and is defined as the center of the entrance pupil for the eye tracking sensor 102. To improve the clarity of the illustration, only two individual 3D rays of the 3D propagation 202 are shown. Each individual ray extends from a point on the sensor plane 302 that falls along the perimeter of the ellipse 204 through the point $\vec{r}_{o}$ and, ultimately, to a point on the Iris-Pupil plane 206 that falls along the perimeter of the pupil 106 or iris 108. In plain terms, the 3D propagation 202 represents the reverse of the projections of the pupil 106 or iris 108 through the point $\vec{r}_{o}$ and to the sensor plane 302. Thus, in three dimensional terms the rays that start from the sensor plane 302 and pass through point $\vec{r}_{o}$ (e.g., the center of the entrance pupil of the eye tracking sensor 102) and then travel some additional distance to reach the circular perimeter of the pupil 106 or iris 108 at the Iris-Pupil plane 206 is given by Equation 2 shown below:

$$\vec{r}_{ip}^{d}(i,j) = \vec{r}_{o} + [\sqrt{p_{ip}^{2}+d_{ipo}^{2}} + \sqrt{|D_{cip}(i,j)|^{2}+f^{2}}]\hat{T}_{oip}(i,j) \quad (2)$$

where, $\vec{r}_{o}$ is a point at which all of the rays of a particular image cross prior to forming an image on the sensor plane 302, $d_{ipo}$ is the distance from the point $\vec{r}_{o}$ to the center of the iris/pupil $\vec{r}_{ip}^{o}$ (as labeled in FIG. 4), $D_{cip}$ is the radial distance between the center of the eye tracking sensor 102 and the ellipse points $E_{ip}$, f is the focal length of the eye tracking sensor 102, and $\hat{T}_{oip}(i,j)$ is the vector going from the points in the ellipse 204 to the point $\vec{r}_{o}$.

In some embodiments, the systems described herein may determine one or more of an orientation Rot($\phi$, $\Theta$) of the Iris-Pupil plane 206, a radius $p_{ip}$ of the pupil 106 or iris 108 (e.g., whichever circular feature is being observed to perform eye tracking), and the distance $d_{ipo}$ from the point $\vec{r}_{o}$ to the center $\vec{r}_{ip}^{o}$ of the iris/pupil by analyzing the 3D propagations 202 with respect to an ocular rotation model. The ocular rotation model may be usable to model rotation of a circular feature of an eye around that eye's center of rotation $\vec{r}_{c}$. For example, an ocular rotation model may define coordinates of a circle with a center $\vec{r}_{ip}^{o}$ (i, j) and a radius $p_{ip}$ and that is rotated around the eye's center of rotation $\vec{r}_{c}$ an elevation angle $\Theta$ and azimuth angle as given by Equation 3 shown below:

$$\vec{r}_{ip}^{r} = Rot(\phi, \Theta) \cdot (\vec{r}_{ip}^{o} + \vec{r}_{ip}^{c}(i,j) - \vec{r}_{c}) + \vec{r}_{c} \quad (3)$$

where the position of the center of the circle is given by $\vec{r}_{ip}^{o} = \{\bar{x}_{ip}^{o}, \bar{y}_{ip}^{o}, \bar{z}_{ip}^{o}\}$, and the parametrized coordinates of the circle are defined as $\vec{r}_{ip}^{c}(i,j) = \{p_{ip}\cos\varphi, p_{ip}\sin\varphi, 0\}$. In various embodiments, the center of the iris/pupil circle and the center of rotation of the eye $\vec{r}_{c}$ are defined from one or more anatomical eye models such as, for example, the Gullstrand model, the Arizona model, the Liou-Brennan model, and/or the Navarro model. Moreover, as described in more detail below, a user-specific calibration may be performed to complete global minimization of the various parameters used in Equation 3 to customize the ocular rotation model to a specific user.

As a specific but non-limiting example, the orientation Rot($\phi$, $\Theta$) of the Iris-Pupil plane 206, the radius $p_{ip}$ of the pupil 106 or iris 108, and the distance $d_{ipo}$ from the point $\vec{r}_{o}$ to the center $\vec{r}_{ip}^{o}$ of the iris/pupil are determined by minimizing the error between the 3D propagations 202 of the points detected (e.g., in the sensor plane 302) $\vec{r}_{ip}^{d}$ through the vector $\hat{T}_{cip}(i,j)$, and a circle of radius $p_{ip}$ rotated around the eye center $\vec{r}_{c}$. An exemplary such error minimization technique is given by Equation 4 shown below:

$$Err(p_{ip}, d_{ipo}, Rot(\phi, \Theta)) = \operatorname{argmin} \sum_{i,j} \left\| \vec{r}_{ip}^{d}(i,j) - \vec{r}_{ip}(i,j) \right\|^{2} \quad (4)$$

It will be appreciated that upon determining the orientation Rot($\phi$, $\Theta$) of the Iris-Pupil plane 206 and the distance $d_{ipo}$ from the point $\vec{r}_{o}$ to the center $\vec{r}_{ip}^{o}$ of the iris/pupil, the systems disclosed herein can then determine where an optical axis for a tracked eye begins and in which direction it propagates with respect to the eye tracking sensor 102. Additionally, in embodiments that include two eye tracking sensors 102 which are separated by a known distance, upon determining the location of the center $\vec{r}_{ip}^{o}$ of the pupil for both eyes in relation to the eye tracking sensors 102, the systems disclosed herein can dynamically determine an interpupillary distance (IPD) for the user (as shown in FIG. 2).

Figure 5A:
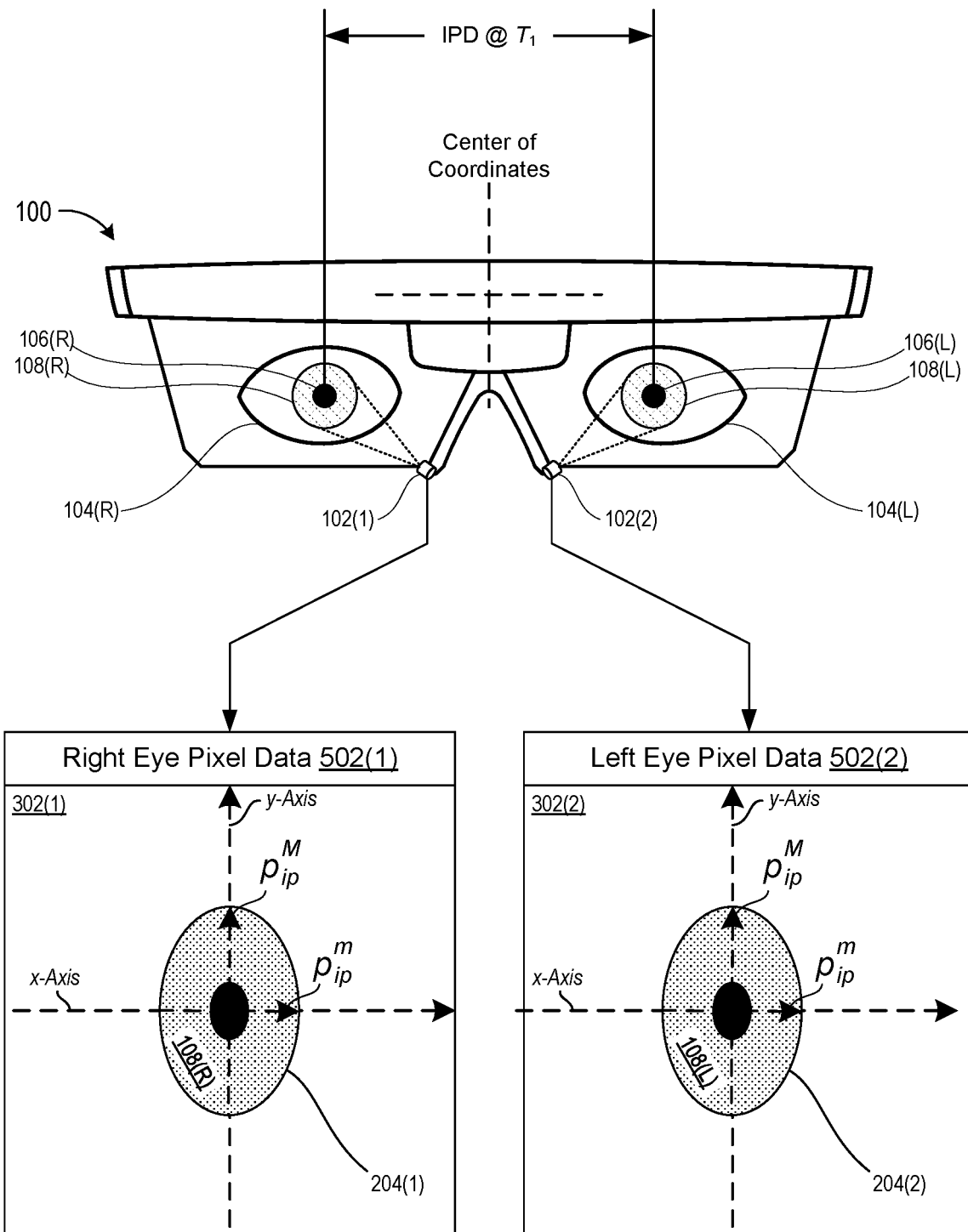
FIG. 5A illustrates exemplary eye tracking data in the form of pixel data that is generated by the sensors and that is usable to implement the techniques described herein.

Turning now to FIG. 5A, exemplary eye tracking data is shown in the form of pixel data 502 that is generated by the eye tracking sensors 102 and that is usable to implement the techniques described herein. As illustrated in FIG. 5A, a NED device 100 includes a first eye tracking sensor 102(1) that is angularly offset from and directed toward a user's right eye 104(R) and a second eye tracking sensor 102(2) that is angularly offset from and directed toward a user's left eye 104(L). As the user's eyes move around to look at and/or track various objects within the user's field-of-view (FOV), the eye tracking sensors 102 continually capture images of the pupils 106 and/or irises 108 of the user's eyes.

Similar to FIG. 1, FIG. 5A is illustrated from a particular perspective that is directly in front of the user's while the user's is looking straight forward. Thus, the optical axis of each of the eyes 104 is normal to the page and the pupils 106 and irises 108 are illustrated to be perfect circles. Since each of the eye tracking sensors 102 is angularly offset from the optical axis of the particular eye that it is imaging, the pixel data 502 corresponding to each eye defines the pupils 106 and irises 108 as ellipses. As described above, these ellipses correspond to projections of the pupils 106 and irises 108 onto the corresponding sensor planes 302. Moreover, depending on the optical characteristics of the eye tracking sensors 102 and/or lenses thereof, these projections may be defined by a series of rays that all pass through a common point such as the center of the entrance pupil of the eye tracking sensor 102.

As described above, the ellipses that are formed by the projections of the pupils 106 and/or irises 108 onto the corresponding sensor plane 302 have unique orientations and semi-axes for any particular subtended angle of the eye tracking sensor 102 and rotation of the eye being tracked. As illustrated in FIG. 5A, each of the right eye pixel data 502(1) and the left eye pixel data 502(2) define an image of a corresponding elliptically shaped iris 108. Each elliptically shaped iris 108 has a semi-major axis that is labelled $p_{ip}^{M}$ and a semi-minor axis that is labelled $p_{ip}^{m}$. The sensor planes 302 are each illustrated with a corresponding sensor coordinate system centered thereon. Each sensor coordinate system includes a vertical y-Axis and a horizontal x-Axis. Additionally, as illustrated, each elliptically shaped iris 108 is aligned with (e.g., centered on and not rotated with respect to) a corresponding sensor coordinate system. Thus, within each of the sensor planes 302(1) and 302(2), the perimeters of the right elliptically shaped iris 108(R) and the left elliptically shaped iris 108(L) define a first ellipse 204(1) and a second ellipse 204(2), respectively. Each of the ellipses 204 are centered at $(\bar{x}_{ip}^{d}, \bar{y}_{ip}^{d})$ with semi-major axis $p_{ip}^{M}$ and semi-minor axis $p_{ip}^{m}$ and is not rotated respect to the horizontal x-Axis of their corresponding sensor plane 302.

Figure 5B:
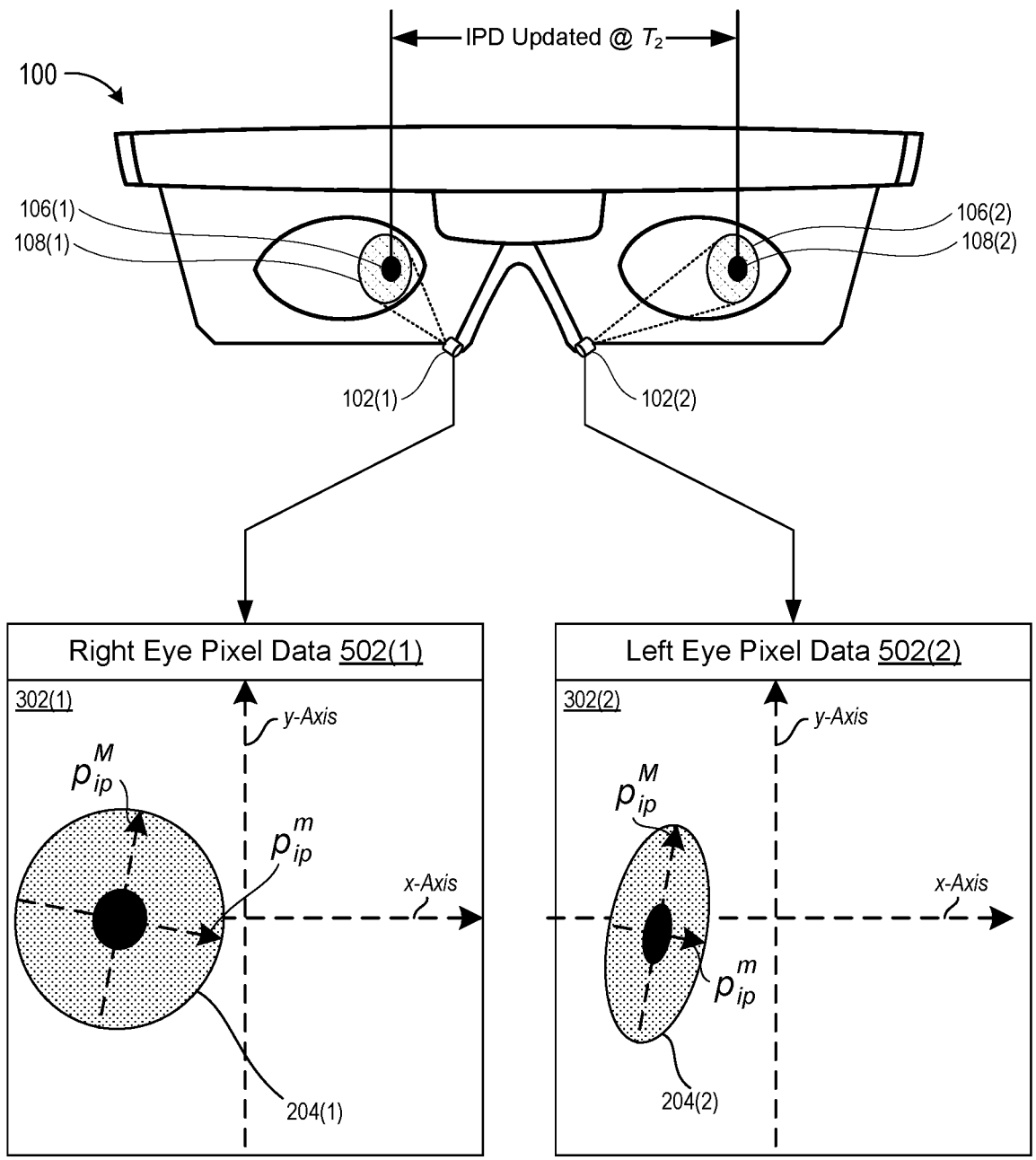
FIG. 5B illustrates exemplary eye tracking data in the form of pixel data that has changed in relation to FIG. 5A due to the user's focus shifting to the left.

Turning now to FIG. 5B, exemplary eye tracking data is shown in the form of pixel data 502 that has changed in relation to FIG. 5A due to the user's focus shifting to the left. As illustrated, the first ellipse 204(1) that corresponds to the projection of the user's right eye 104(R) has shifted and rotated in relation to the first sensor plane 302(1). Additionally, the semi-minor axis $p_{ip}^{m}$ of the first ellipse 204(1) has lengthened since the right eye's optical axis is directed more towards the eye tracking sensor 102(1) in FIG. 5B (e.g., after the user looks left) that it was in FIG. 5A. As further illustrated, the second ellipse 204(2) that corresponds to the projection of the user's left eye 104(L) has shifted and rotated in relation to the second sensor plane 302(2). Additionally, the semi-minor axis $p_{ip}^{m}$ of the second ellipse 204(2) has shortened since the left eye's optical axis is directed more away from the second eye tracking sensor 102(2) in FIG. 5B (e.g., after the user looks left) that it was in FIG. 5A.

In various embodiments, the eye tracking data for the user's two eyes may be used to continually and dynamically determine the current (e.g., real time) interpupillary distance (IPD) of the user. In particular, the eye tracking data may be analyzed to determine ellipse parameters that define the ellipses 204 for each eye within the corresponding sensor plane 302. Then, using the techniques described above with respect to equations 1 through 4, the center points $\vec{r}_{ip}^{o}$ for each eye may be determined with respect to the corresponding eye tracking sensor 102. Since the eye tracking sensors 102 are mechanically fixed at known locations and angles with respect to each other, the determined center points $\vec{r}_{ip}^{o}$ for the right eye 104(R) with respect to the first eye tracking sensor 102(1) and the left eye 104(L) with respect to the second eye tracking sensor 102(2) together yield the IPD at particular time at which the pixel data was captured. Thus, as shown in FIG. 5A, an IPD can be initially determined in association with pixel data that is captured at a first time $T_1$. Then, as shown in FIG. 5B after the user has looked to the left, an updated IPD can be determined can be determined in association with other pixel data that is captured at a second time $T_2$.

Figure 6:
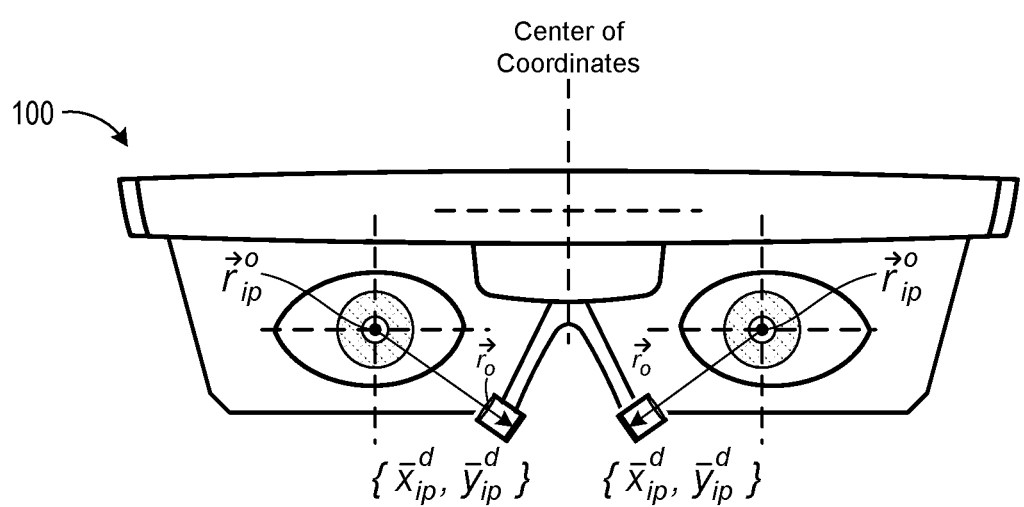
FIG. 6 illustrates exemplary positions of a user's fovea in relation to the optical axes of the user's left and right eyes.

Turning now to FIG. 6, illustrated is the exemplary NED device 100 with various geometrical features labeled thereon that are relevant to a specific technique for calculating the interpupillary distance (IPD). It can be appreciated that Equation 2 as described above can be modified to specifically place the center of the pupil $\vec{r}_{ip}^{d}$ (center) in space for both the left and right eyes. Specifically, Equation 2 can be modified into Equation 2.1 as shown below:

$$\vec{r}_{ip}^{d}(\text{center}) = \vec{r}_{o} + [d_{ipo} + \sqrt{D_{\text{cip}}(\text{center})^2 + f^2}]\hat{T}_{oip}(\text{center}) \quad (2.1)$$

Then, once the center of the pupil for each of the right eye 104(R) and the left eye 104(L) have been placed in space, the IPD can be obtained as the norm of the subtraction of the projected pupillary axis for the left eye and the right eye—as given by Equation 5 below:

Interpupilary Distance (IPD)=$\|\vec{r}_{ip}^{d}(\text{left, center}) - \vec{r}_{ip}^{d}(\text{right center})\|$ (5)

Figure 7:
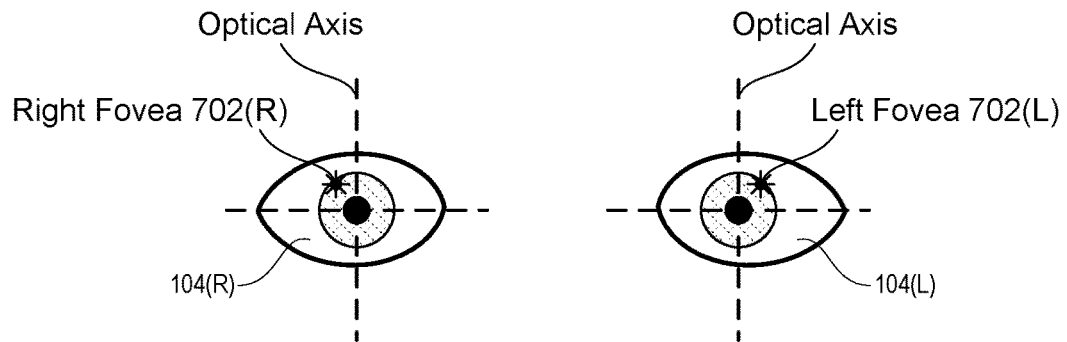
FIG. 7 illustrates exemplary positions of a user's right fovea and left fovea in relation to the optical axes of the user's right eye and left eye, respectively.

Turning now to FIG. 7, illustrated are exemplary positions of a user's right fovea 702(R) and left fovea 702(L) in relation to the optical axes of the user's right eye 104(R) and left eye 104(L), respectively. As can be seen from FIG. 7, the position of the fovea for each eye is eccentric (e.g., not centrally placed) regarding the optical axis of the corresponding eye. Generally speaking, the right fovea 702(R) tends to be positioned in the second quadrant for the right eye 104(R) whereas the left fovea 702(L) tends to be positioned in the first quadrant for the left eye 104(L). This is consistent with the illustrated positions of the fovea in FIG. 7. The fovea 702 is the specific region of the retina at which visual acuity is highest due to the user's retinal cones being particularly concentrated in this area. For this reason, the center of the user's field of vision for each eye is focused at the fovea for that eye. The result is that the user's visual axis passes through the center of the fovea 702 so that light from whatever object the user is currently focused on passes through the pupil and lens of the eye before ultimately striking the fovea 702.

Figure 8:
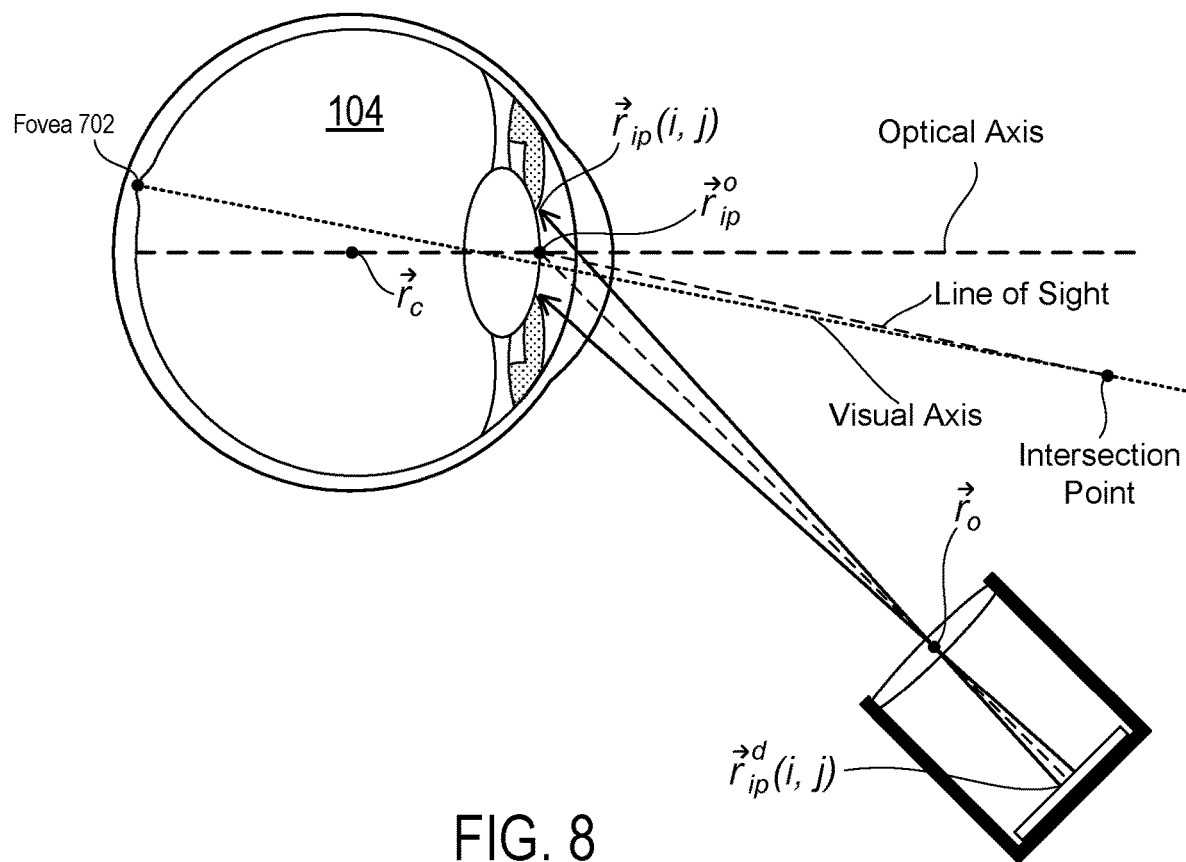
FIG. 8 illustrates a side view of a user's eye showing how the offset position of the user's fovea in relation to the optical axis results in the visual axis diverging from the optical axis.

Turning now to FIG. 8, illustrated is a side view of a user's eye 104 showing how the offset position of the user's fovea in relation to the optical axis results in the visual axis diverging from the optical axis. As illustrated, the fovea position being above the optical axis at the back of the user's eye results in the visual axis pointing down slightly. It should also be appreciated from the combination of FIGS. 7 and 8 that the visual axes of the user's eyes will also tent to be pointed inward slightly.

As shown in FIG. 8, a line of sight of the user extends from the center of the entrance pupil $\vec{r}_{ip}^{\,o}$ and intersects the visual axis at a singular intersection point. Accordingly, when the user is focused on an object at a particular accommodation plane, determining the user's line of sight may be adequate to determine where the user is focused. However, since the visual axis will be most closely directed at whatever object the user is focused on regardless of the depth at which the user is focused, conventional eye tracking methods that merely track the user's line of sight are inadequate for determining where the user is focused for all accommodation planes. By dynamically tracking the user's visual axis, the eye tracking systems disclosed herein are able to determine a vergence in space at which the user is currently focused independent of what accommodation plane that vergence falls on.

In some instances, convention eye tracking systems estimate the user's line of sight by observing the Purkinje reflections with the addition of head tracking information. Unfortunately, even an accurate estimation of the user's line of sight may be insufficient to accurately determine the depth at which the user is focusing within the real-world environment. This is because the user's line of sight and the user's visual axis (which actually propagates to the user's fovea) only converge at a single depth plane. Although the visual axis is illustrated as a straight and continuous line in FIG. 8, it will be appreciated by one skilled in the art that the actual optical path of the visual axis is more aptly described as a line connecting the fixation point (at which the user is focused) to the first and second nodal points (not shown in FIG. 8) and the user's Fovea.

Figure 9:
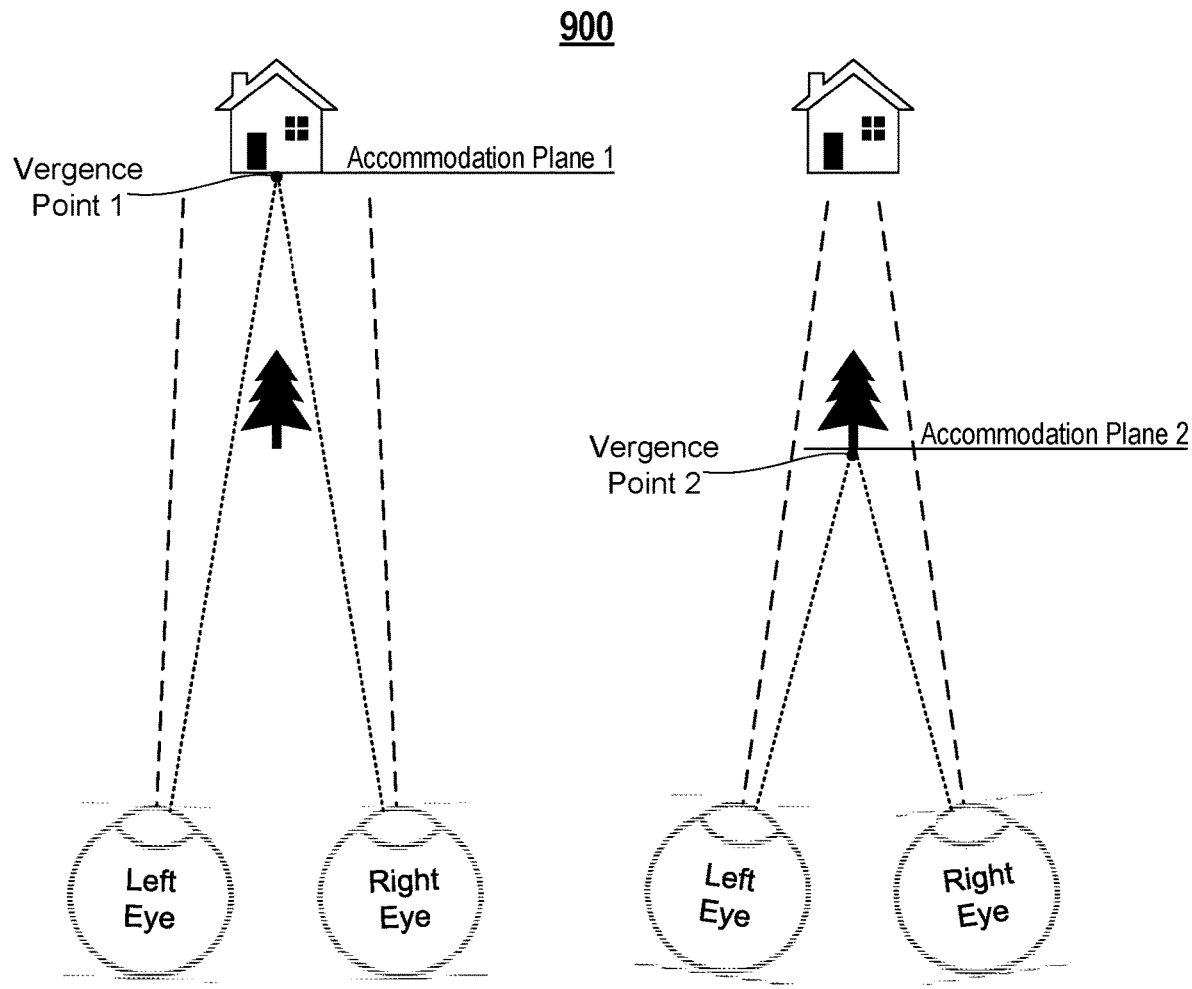
FIG. 9 illustrates an exemplary environment in which a user may perform vergence movements of the eyes to shift a vergence of the two visual axes (e.g., a focal point) from a first accommodation plane to a second accommodation plane.

Turning now to FIG. 9 to demonstrate the foregoing point, illustrated is an exemplary environment 900 in which a user may perform vergence movements of the eyes to shift a vergence of the two visual axes (e.g., a focal point) from a first accommodation plane to a second accommodation plane. It will be appreciated that vergence movements are closely connected to accommodation of the eye. Under normal conditions, changing the focus of the eyes to look at objects at different distances will automatically cause vergence and accommodation. This is sometimes referred to as the accommodation-convergence reflex. Generally speaking, a vergence movement comprises the simultaneous movement of a binocular system (e.g., the user's two eyes) in opposite directions to perform a depth operation. When the user performs a vergence movement to change a focus from a distant object to a relatively closer object, the eyes rotate toward each other (i.e., the eyes perform a convergence movement). When the user performs a vergence movement to change a focus from a close object to a relatively more distant object, the eyes rotate toward away from each other (i.e., the eyes perform a divergence movement).

The left side of FIG. 9 shows the focus of the user on a house at "Accommodation Plane 1" that is relatively farther from the user than "Accommodation Plane 2." Thus, on the right side of FIG. 9 the visual axes each reach a common vergence point that resides on the house whereas a vergence of the lines of sight (which conventional systems track) does not actually represent where the user is focused. The left side of FIG. 9 shows the focus of the user on a tree that is at an Accommodation Plane 2 that is relatively closer to the user. Thus, on the left side of FIG. 9 the visual axes each reach a common vergence point that resides on the tree whereas a vergence of the lines of sight again does not actually represent where the user is focused.

In some embodiments, visual axis offset data is used to continuously track the visual axis of the user's eyes 104. For example, it can be appreciated that by deploying various techniques as described above, the eye tracking systems described herein may continually determine the optical axis and the orientation Rot($\phi$, $\Theta$) of the Iris-Pupil plane 206. Exemplary visual axis offset data defines a spatial relationship between the optical axis of the eye and/or the orientation Rot($\phi$, $\Theta$) of the Iris-Pupil plane 206 of the eye 104. Thus, upon determining the optical axis and/or the orientation Rot($\phi$, $\Theta$) for a particular eye, the eye tracking systems described herein may utilize the visual axis offset data to calculate the visual axis.

Figure 10:
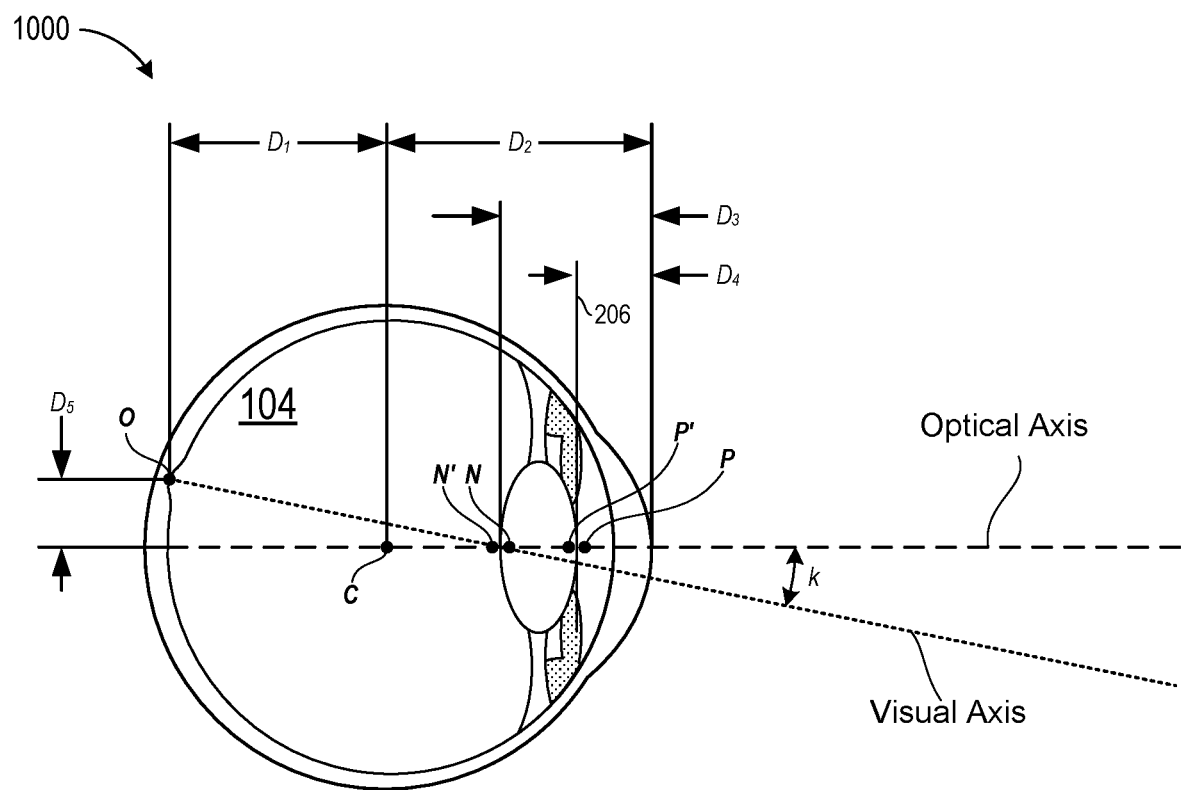
FIG. 10 illustrates an exemplary anatomical eye model that defines geometrical relationships between various portions of an eye.

Turning now to FIG. 10 to demonstrate the foregoing point, illustrated is an exemplary anatomical eye model 1000 that defines geometrical relationships between various portions of an eye 104. As illustrated, the anatomical eye model 1000 defines: a horizontal dimension $D_1$ from the center of the eye 104 (i.e., the point labeled "C") to the fovea (i.e., the point labeled "O"); a horizontal dimension $D_2$ from the center of the eye 104 (i.e., the point labeled "C") to the front surface of the cornea; a horizontal dimension $D_3$ from the front surface of the cornea to a rear surface of the lens of the eye 104 (i.e., the point labeled "N"); a horizontal dimension $D_4$ from the front surface of the cornea to a front surface of the lens of the eye 104 (i.e., the point labeled "P"); and a vertical dimension $D_5$ from the center of the eye 104 (i.e., the point labeled "C") to the fovea (i.e., the point labeled "O"). In various implementations, these or other dimensions may be used to define the visual axis offset data. The values for the relevant dimensions may be taken from any variety of suitable models that include, but are not limited to, the Gullstrand model, the Arizona model, the Liou-Brennan model, and/or the Navarro model.

As illustrated in FIG. 10, the visual angle $\vec{VA}_{N'}$ line may be represented as a vector that extends from the fovea at point "O" to the point labeled "N'" that represents the rear surface of the lens of the eye 104. The visual angle $\vec{VA}_{N'}$ line subtends an angle k from the optical axis and can be defined based on Equation 6 below:

$$\vec{VA}_{N'} = \frac{\vec{r}_{N'} - \vec{r}_O}{|\vec{r}_{N'} - \vec{r}_O|} = \frac{\vec{R}_{N'O}}{|\vec{R}_{N'O}|} \tag{6}$$

where $\vec{r}_{N'}$ is the image nodal position and $\vec{r}_o$ is the central position of the fovea 702. In general, literature has reported that the angle k ranges between 4 and 8 degrees.

It can be appreciated that by applying the definition of nodal points to the exemplary anatomical eye model 1000, there is a conservation of the angles regarding the optical axis. For this reason, the line that starts from the object nodal point "N" can be described by Equation 7 given below:

$$\vec{VA}_N = \vec{r}_N + D_{SN} \vec{VA}_{N'} \tag{7}$$

where $\vec{r}_N$ is the object nodal point and $D_{SN}$ is the distance between object nodal point "N" and the stimulus (e.g., object) upon which the user is focused.

Based on the foregoing, it can be appreciated that the rotation calculated from the minimization technique described in relation to Equation 4 as applied over $\vec{VA}_N$ regarding to the center $\vec{r}_C$ of the eye 104 must be equal to the vector joining the stimulus and the target as given by Equation 8 below:

$$Rot(\phi,\Theta)(\vec{R}_{SC} + \|\vec{R}_{SN}\| \vec{VA}_{N'}) = \vec{R}_{SC} \tag{8}$$

It can be appreciated that the various nodal points that are illustrated in FIG. 10 and described throughout this document will change in relative position as the user focuses on object at different accommodation planes. For example, in focusing on objects at different depths, the lenses of the eyes are of course caused to change shape. As these shape changes occur the rear surface of the lens may shift between the nodal point labeled "N" and the nodal point labeled "N'" whereas the front surface of the lens may shift between the nodal point labeled "P" and the nodal point labeled "P'." Notable, these changes in the shape of the lens and positions of the nodal points that are triggered by accommodation changes have an insignificant impact on the orientation and placement of the visual axis within the eye. For this reason, in various embodiments the visual axis offset data may define relationships between the optical axis of the eye in a manner that is independent of the current accommodation plane upon which the user is focused.

Figure 11:
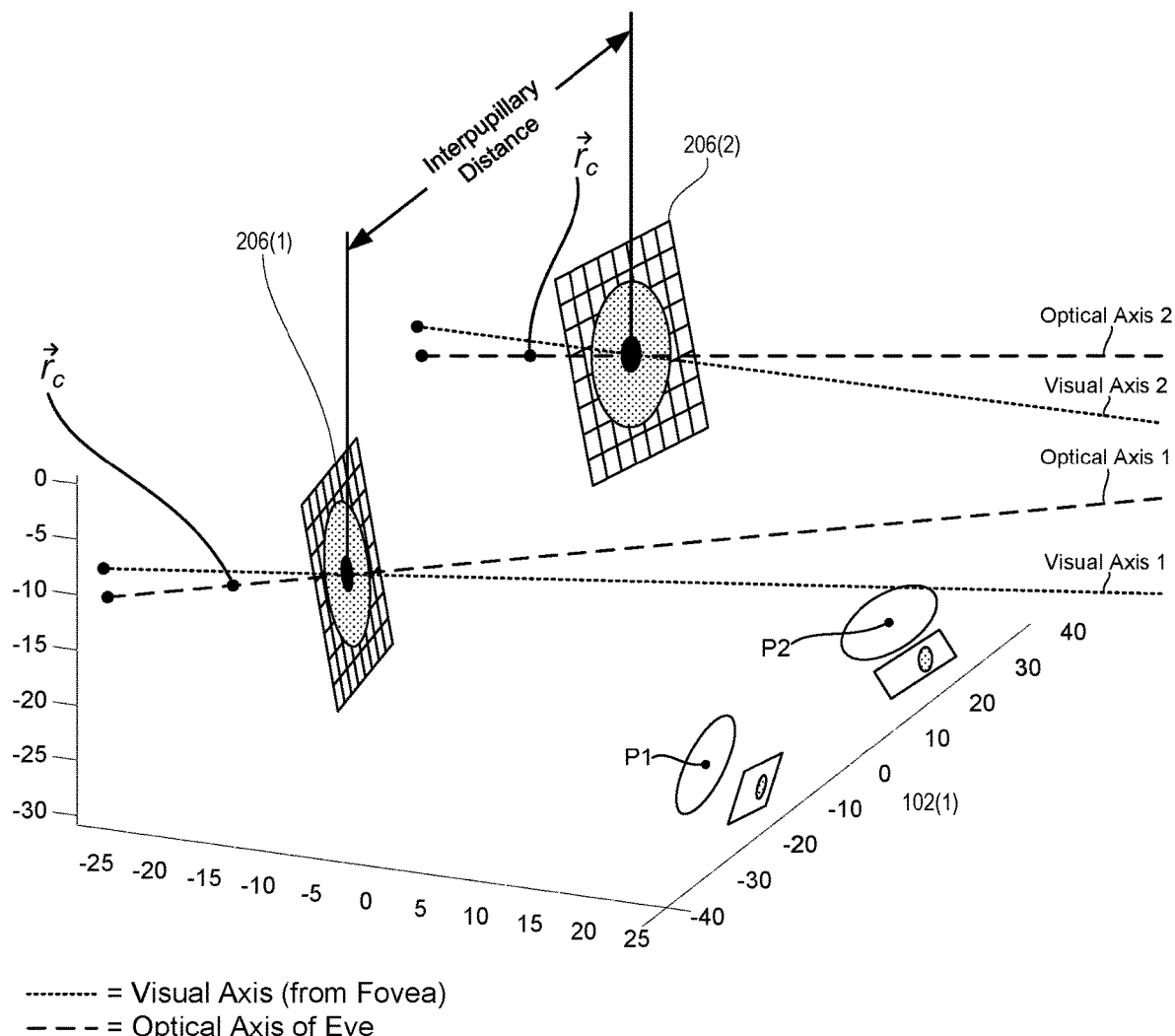
FIG. 11 illustrates a pair of visual axes that are determinable based on visual axis offset data defining a spatial relationship between the individual visual axes and corresponding optical axes.

To illustrate the foregoing, FIG. 11 illustrates a pair of visual axes that are determinable based on visual axis offset data defining a spatial relationship between the individual visual axes and corresponding optical axes. As illustrated in FIG. 10, upon determining the optical axis and the orientation $Rot(\phi, \Theta)$ of the Iris-Pupil plane 206 for each eye 104, the eye tracking systems described herein can then calculate the visual axes for each eye. These calculations may be done continuously based on visual axis offset data that defines a spatial relationship between the optical axis of the eye and/or the orientation $Rot(\phi, \Theta)$ of the Iris-Pupil plane 206 of the eye 104.

In some embodiments, upon calculating the pair of visual axes for a particular moment in time, the eye tracking system may then determine the vergence of the visual axes in space. The two visual axes will rarely actually converge in space perfectly. This is because although generally modeled as such, the human body does not behave perfectly symmetrically. Rather, there are slight variations in where the two eyes will actually be pointed in a real-life scenario. As such, in various embodiments, the vergence is calculated by performing minimization techniques with respect to both of the two visual axes. Stated plainly, based on the assumption that the two visual axes will be closest to actually converging at or very near the point in space that the user is actually focusing, the techniques described herein may determine the vergence point to be the point in space at which the visual axes are closest together.

Figure 12:
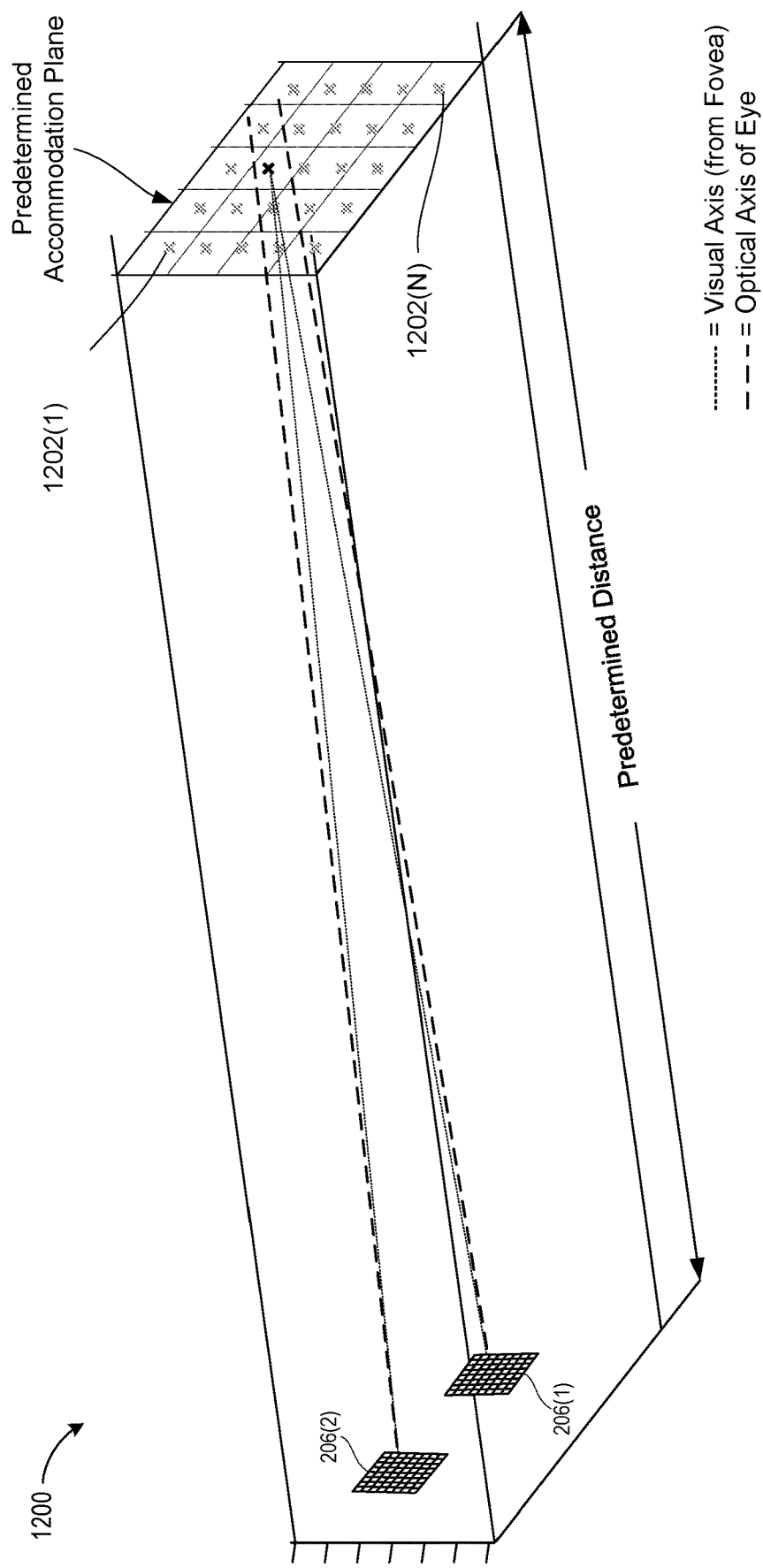
FIG. 12 illustrates an exemplary environment in which a plurality of virtual stimuli can be sequentially generated at a predetermined accommodation plane for performance of a user-specific calibration process.

Turning now to FIG. 12, illustrated is an exemplary environment 1200 in which a plurality of virtual stimuli 1202 can be sequentially generated at a predetermined accommodation plane for performance of a user-specific calibration process. As illustrated, the plurality of virtual stimuli 1202 may be uniformly spaced in a predetermined grid shaped pattern at a predetermined accommodation plane. The predetermined accommodation plane may be spaced a predetermined distance in front of the NED device 100 (not shown in FIG. 12). As a specific but non-limiting example, the predetermined accommodation plane may be spaced a distance of two meters in front of the user. It should be appreciated that as the stimuli are virtual in nature, the virtual stimuli may be generated at the accommodation plane of two meters by a display element (e.g. a waveguide display) that is located at a much closer distance to the user's eyes than two meters. For example, modern NED devices are capable of rendering images at a plurality of accommodation depths all from a transparent display that is positioned between fifteen and thirty-five millimeters from the user's eyes.

To perform the user-specific calibration process, individual ones of the virtual stimuli 1202 are sequentially rendered (e.g., one at a time) to cause the eyes of the subject to rotate so that the visual axes converge at the currently rendered virtual stimuli. Then, the discrepancy between the orientations $Rot(\phi, \Theta)$ of the Iris-Pupil plane 206 as the user's focus changes between the individual stimuli can be exploited to determine the optimum visual axis for that specific user. Stated plainly, the visual axis offset data can be customized for the specific user.

During performance of the user-specific calibration process, the orientation $Rot(\phi, \Theta)$ of the Iris-Pupil plane 206 while the user is focused on each individual one of the virtual stimuli 1202. Then, various error minimization techniques can be deployed to determine what the optimum visual axis is for the user. As a specific example of such an error minimization technique is given by Equation 9 as shown below:

$$Err(\vec{VA}_{N'}) = \sum_{i=1}^{m} \sum_{j=1}^{n} \left\| Rot(\phi, \Theta, i, j)(\vec{R}_{SC}(i, j) + \|R_{SN}\|\vec{VA}_{N'}) - \vec{R}_{SC}(i, j) \right\|^2 \quad (9)$$

This type of minimization technique has the advantage that it is convex and that the visual axis can be calculated analytically. Furthermore, while the coordinates of the stimulus are known $\vec{r}_S$, the values of the center of rotation of the eye $\vec{r}_C$, and the object nodal point $\vec{r}_N$ can be either introduced following anatomical models like Gullstrand, Arizona, Liou-Brennan or Navarro among others, or otherwise, a global minimization can be performed for custom values.

Figure 13:
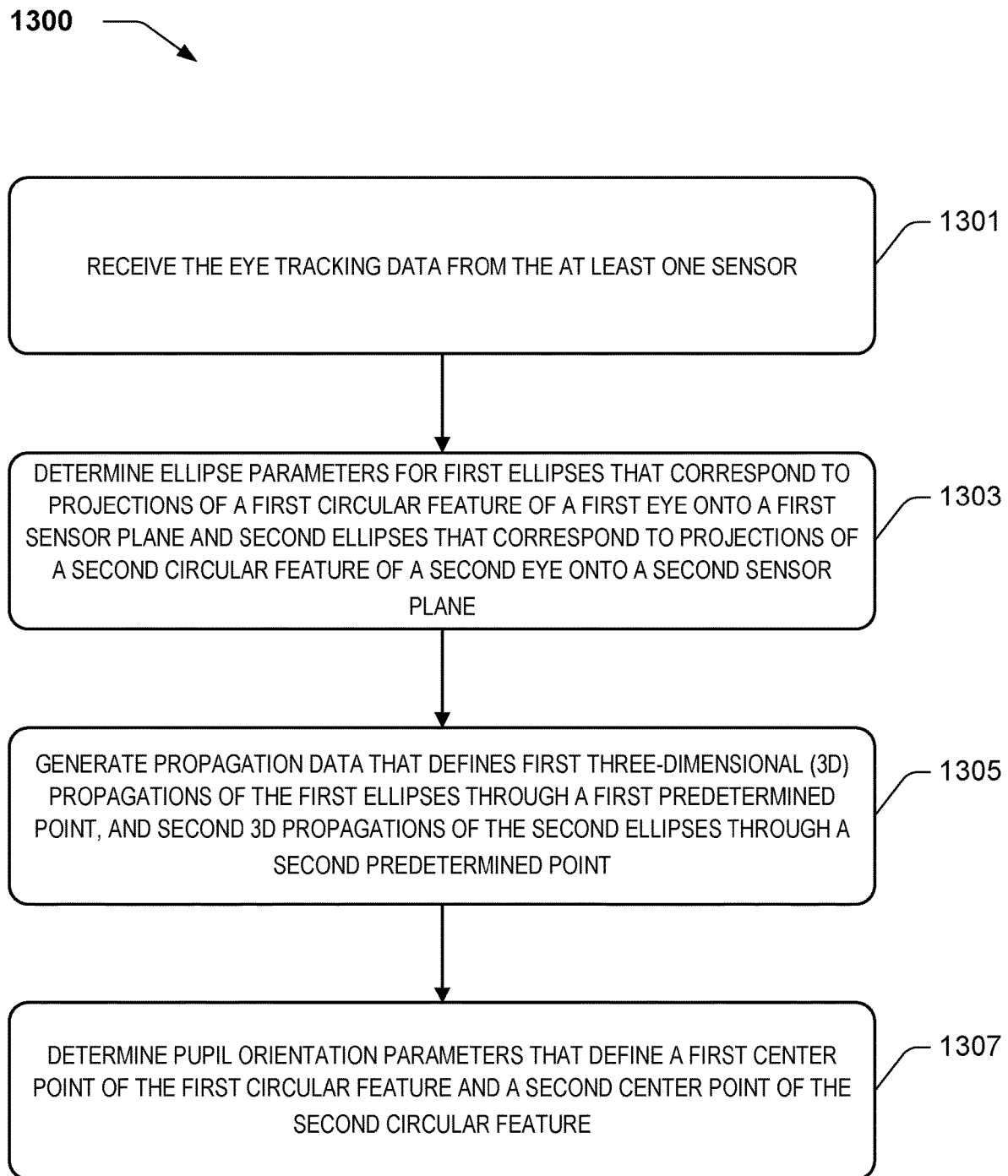
FIG. 13 is a flow diagram of a process 1300 to generate propagation data that defines three-dimensional (3D) propagations from ellipses detected at a sensor plane to determine pupil orientation parameters.

Turning now to FIG. 13, a flow diagram is illustrated of a process 1300 to generate propagation data that defines three-dimensional (3D) propagations from ellipses detected at a sensor plane to determine pupil orientation parameters. The process 1300 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 1301, an eye tracking system receives eye tracking data from at least one sensor that is directed toward at least one eye. As described herein, the at least one sensor can be a camera that includes at least one lens through which light passes prior to striking an image sensor (e.g., a CMOS sensor or any other suitable type of image sensor). The eye tracking data may be in the form of pixel data that defines an image of circular feature(s) of the at least one eye. In an exemplary embodiment, the eye tracking data includes images of both a right eye and a left eye of a user of a NED device. Moreover, as described above, the images may include elliptical representations of the circular features of the eyes due to a sensor plane in each of the sensors being angularly offset from an Iris-Pupil plane of the respective eye that each sensor is tracking. In various implementations, the eye tracking system may select between tracking the pupil vs the iris depending on physical characteristics of the user. For example, if the user has very dark irises, there may be very little contrast between the user's pupils and the user's irises. The result of this lack of contrast may be that tracking the user's pupil is impractical. In such a case, the eye tracking system may use the user's iris to perform the eye tracking since there will be greater contrast between the user's iris and the sclera (commonly referred to as the "white of the eye") of the user's eyes than between the user's "dark" iris and the user's dark pupil.

At block 1303, the eye tracking system may determine ellipse parameters for first ellipses that correspond to projections of a circular feature of a first eye (e.g., a right eye) onto a first sensor plane and also for second ellipses that correspond to projections of a circular feature of a second eye (e.g., a left eye) onto a second sensor plane. For example, the system may determine, for each of the first ellipse and the second ellipse, a center-point for the ellipse, a semi-major axis of the ellipse, a semi-minor axis of the ellipse, and an angular rotation of the ellipse with respect to a sensor plane.

At block 1305, the eye tracking system may generate propagation data that defines first 3D propagations of the first ellipse back toward the first eye and second 3D propagations of the second ellipse back toward the second eye. In various embodiments, each of the 3D propagations may comprise a series of lines that all begin at a point along the perimeter of an ellipse that is detected on a sensor plane and then propagation through a predetermined point back toward the eye of a user. It should be appreciated that the 3D propagations described herein may be generally understood as mathematical representations of rays of light rather than actual projections of light that are emitted from the eye tracking system toward the user. Notable, a major benefit of the eye tracking systems and techniques disclosed herein is that light need not be emitted for implementations—rather the eye tracking data can be generated based exclusively on ambient light.

At block 1307, the eye tracking system may utilize the propagation data to determine pupil orientation parameters that define various characteristics of the user's eye(s). Exemplary pupil orientation parameters may define optical axes for one or both of the user's eyes (e.g., an axis of an eye lens), visual axes for one or both of the user's eyes (e.g. axes that extend from the fovea through the lens and into the real-world environment), rotational angles of the user's eyes (e.g. an angle of rotation between a semi-axis of an ellipse and a horizontal axes of the sensor), Iris-Pupil Planes of the user's eyes (e.g. a plane on which the pupil resides), center points for the user's eyes (e.g., a point at which the optical axis (or alternatively the visual axis) intersects the Iris-Pupil plane). Additionally, or alternatively, the pupil orientation parameters may define various other characteristics of the user's eyes.

As described above, in various embodiments the eye tracking system may utilize the pupil orientation parameters and visual axis offset data to determine visual axes that correspond to each of the eyes of the user. Then, the eye tracking system may perform various minimization techniques to determine a vergence between the two visual axes. The determined vergence then represents a focal point within the real-world environment at which the user is currently focused. The vergence may be determined by calculating the point in space at which the two visual axes come the closest to actually converging in pure mathematical terms since in a practical sense the calculated visual axes for a user will rarely (if ever) actually converge.

Figure 14:
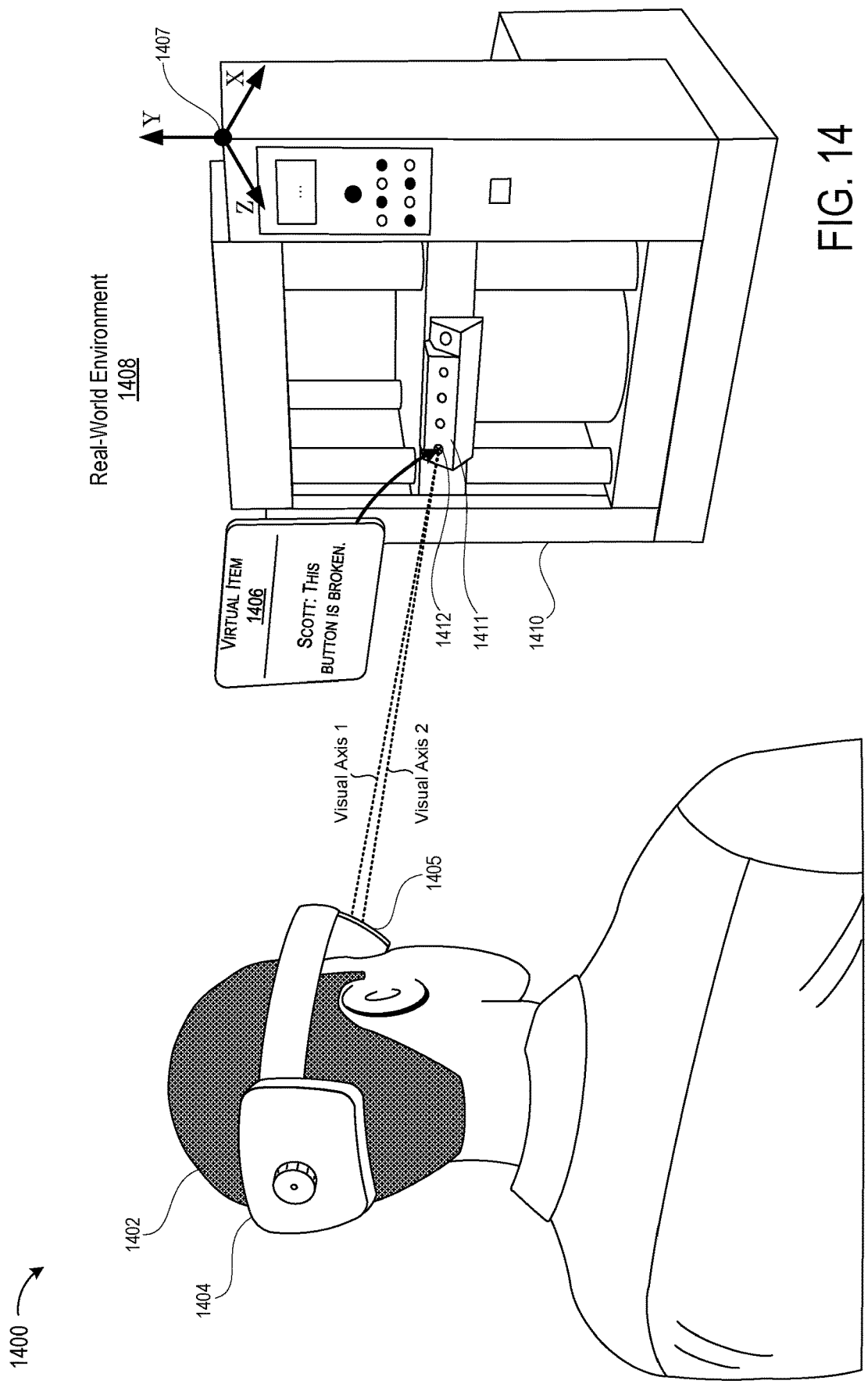
FIG. 14 illustrates an exemplary scenario in which a user is providing input to a NED device in the form user gaze direction to define a position of a virtual item within a real-world environment.

Turning now to FIG. 14, illustrated is an exemplary scenario in which a user 1402 is providing input to a NED device 1404 in the form user gaze direction to define a position of a virtual item 1406 within a real-world environment 1408. The NED device 1404 is configured to render computer generated images (CGIs) in front of a user's eye(s). The NED device 1404 can be used for augmented reality (AR) and/or virtual reality (VR) applications. In implementations where the NED device 1404 is an AR-type Head Mounted Device (HMD) device, a display component 1405 may protrude into the user's field of view. An exemplary type of display component may be a transparent waveguide display that enables the user to see concurrently both the real-world environment 1408 surrounding him or her as well as AR content generated by the display component. In the illustrated embodiment, the NED device 1404 is rendering a virtual item 1406 to augment the user's 1402 perception of the real-world environment 1408. The virtual item 1406 is shown as being a virtual note that includes a message of "Scott: This button is broken." It can be appreciated that proper interpretation of this message may require that the virtual note is presented in a manner so as to provide appropriate spatial context. In some implementations, such spatial context may be provided by anchoring the virtual item 1406 to an appropriate real object 1410 to which the virtual item 1406 relates.

In some embodiments, the NED device 1404 is configured to generate spatial mapping data that defines geometric characteristics of various real objects 1410 that exist within the real-world environment 1408 that surrounds the NED device 1404. For example, the NED device 1404 may map out geometric characteristics of floors, stairs, walls, chairs, industrial machines, tools, or any other physical objects that are detectable by spatial mapping technology. Typically, the spatial mapping data may be generated in association with a real-world coordinate system 1407. In the illustrated scenario, the user 1402 is within a mapping range of a piece of industrial machinery and the NED device 1404 is deploying one or more spatial mapping sensors 103 to map geometric features of the piece of industrial machinery. For purposes of the present discussion, presume that the NED device 1404 generates spatial mapping data that defines characteristics of a control panel 1411 and a specific button 1412 that exists thereon. Further presume that during an inspection of the piece of industrial machinery, the user 1402 discovers that the specific button 1412 is broken and, therefore, is desires inform maintenance personnel. The user generates the illustrated virtual note that includes a message of "Scott: This button is broken."

With respect to providing spatial context for the virtual item 1406 (in this case the virtual note to Scott), the NED device 1404 is configured to track movement of the user's 1402 eyes and, based thereon, to determine an appropriate placement of the virtual item 1406 within the real-world environment 1408. For example, the NED device 1404 may deploy an eye tracking system with cameras directed toward each of the user's eyes to generate eye tracking data. The eye tracking data may be used in an ocular rotation model as described herein to accurately track the user's gaze direction. Additionally, or alternatively, the eye tracking data may be glint based eye tracking data as described above. The gaze direction may be measured in terms of the user's optical axis or visual axis, depending on implantation details. for purposes of the present discussion, the gaze direction corresponds to one or both of the user's visual axis.

As illustrated in FIG. 14, each of the user's the first visual axis and the second visual axis are shown as being directed at the specific button 1412 on the control panel of the real object 1410. In some embodiments, the user 1402 may instruct the NED device 1404 to anchor the virtual item 1406 to the specific button 1412 by deliberately directing his or her eye gaze direction to the specific button 1412 in conjunction with performing a predetermined facial gesture. For example, continuing with the example where the user 1402 closes a single eye to "hold" or "grab" onto the virtual item 1406, while holding his or her eye shut the user 1402 may drag the virtual item 1406 to the specific button 1412 by panning the gaze direction to the specific button 1412. Then, the user 1402 may open the eye to "release" or "let go of" the virtual item 1406. In this example, the user 1402 releasing the virtual item 1406 in this way is interpreted by the NED device 1404 as an instruction to anchor the virtual item 1406 to the specific button 1412. Following receipt of this instruction, the virtual item 1406 becomes anchored with respect to a real-world coordinate system 1407 associated with the real object and, therefore, remains statically located with respect to the real object (e.g., the specific button 1412). Then, as the user 1402 that is wearing the NED device 1404 (or other users wearing other NED devices for that matter) moves around with respect to the real object, the virtual item remains statically anchored (e.g., pinned) thereto.

In this way, the user 1402 that is wearing the NED device 1404 is enabled to provide "hands-free" user input instructions to "drag-and-drop" the virtual item 1406 throughout the real-world environment 1408 simply by gazing around to drag the virtual item 1406. Furthermore, in some embodiments the user can hold onto the virtual items 1406 simply by locking his or her gaze onto it by deliberately performing some predefined facial gesture. Then, while holding the virtual item 1406 (e.g., by holding a left eye closed) the user 1402 can carefully adjust his or her gaze direction to drag the virtual item 1406 to a desired location in 3D space before releasing the virtual item 1406 at the desired location. In some embodiments, the virtual item 1406 remains statically located within the real-world environment 1408 so that other users are provided with the same spatial context as to where in 3D space the virtual item 1406 belongs. For example, after the user 1402 anchors the virtual item 1406 to the specific button 1412, another user (e.g., Scott from maintenance) may enter the real-world environment 1408 and immediately be presented with the virtual item 1406 in the appropriate spatial context. For example, in the specifically illustrated example, the virtual note that states "Scott: This button is broken" is displayed to Scott from maintenance directly adjacent to the specific button 1412 to which the user 1402 was referencing in the virtual note.

FIGS. 15A through 15E are related figures that together illustrate an exemplary sequence of eye movements and facial gestures that may be performed to provide user input instructions to a NED device that is configured to implement various techniques disclosed herein. FIGS. 15A through 15E are described in the context of a scenario where a person is using eye movements to adjust a position of a virtual item 1502 with respect to one or more real objects 1504 that physically exist within a real-world environment 1500. Although not limited to such a scenario, an appreciation of various aspects of the invention is readily gained through a discussion of an example in such a context. The techniques described herein are usable to facilitate "hand-free" user input instructions to manipulate virtual item positions in any other suitable context.

Figure 15A:
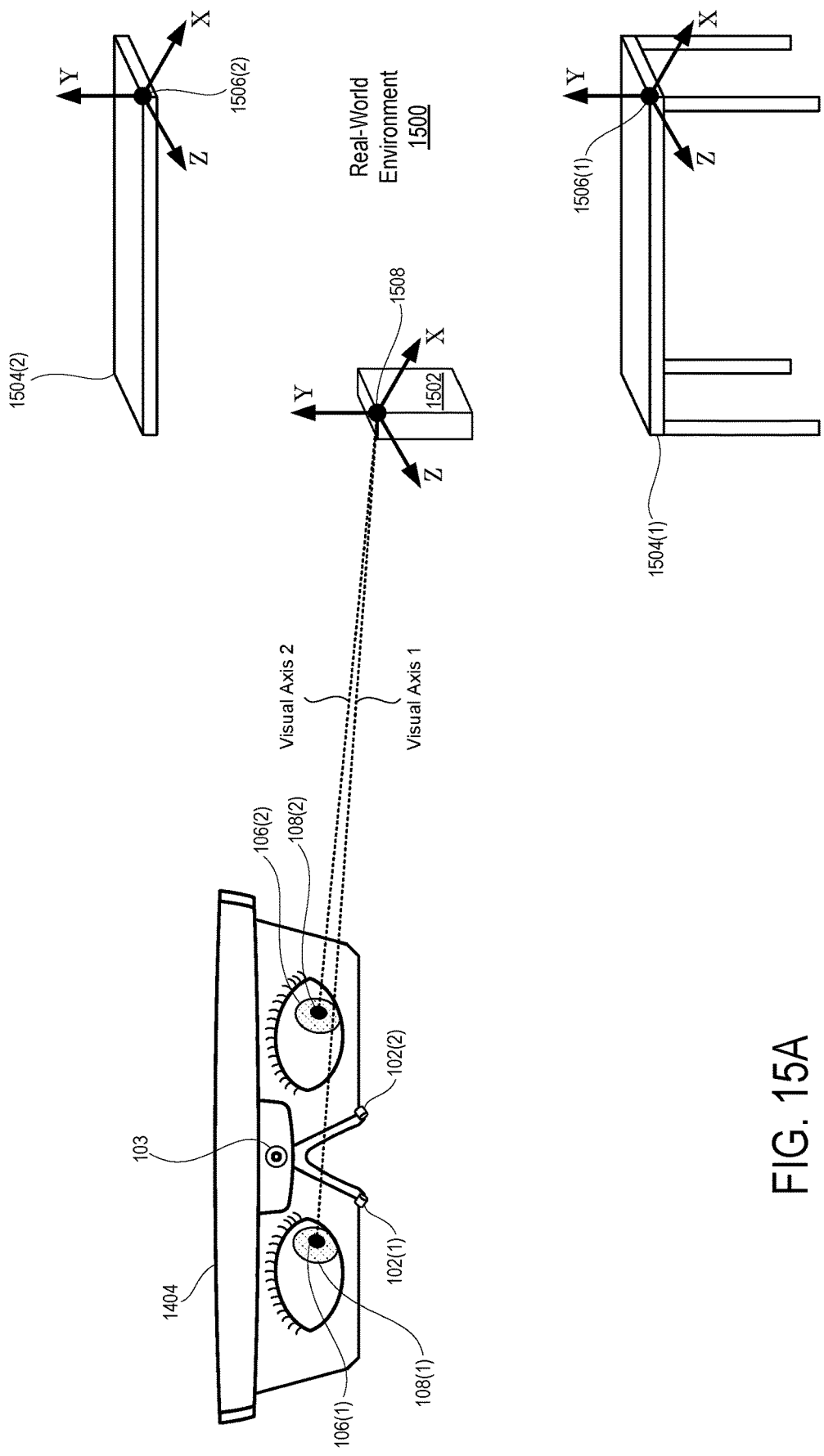
FIG. 15A shows a NED device that is rendering the virtual object to augment a user's perception of the real-world environment.

Turning now to FIG. 15A, illustrated is a NED device 1404 that is rendering the virtual object 1502 to augment a user's perception of the real-world environment 1500. In some embodiments, the NED device 1404 may be tracking eye movements of the user to continually monitor a gaze direction of the user. For example, the NED device 1404 may be tracking the optical axis for one or both of the user's eyes. Additionally, or alternatively, the NED device 1404 may be tracking the visual axis for one or both of the user's eyes. In this way, the NED device 1404 may be actively determining whether the user is focusing their attention on any particular virtual object 1502 or real objects 1504—and if so which one. As described above, in embodiments that track the user's visual axis, the NED device 1404 can accurately determine not only the direction the user is gazing but also the precise distance at which the user is focusing. The NED device 1404 may also be monitoring for predetermined facial gestures that may serve as indication that the user desires to hold onto a virtual item (e.g., to drag the virtual item through the 3D space of the real-world environment 1500) and/or that the user desires to release the virtual item (e.g., to drop the virtual item at a desired location in the 3D space). Exemplary facial gestures include, but are not limited to, holding a left eye closed, holding a right eye closed, blinking a left eye and/or right eye, performing rapid successions of single eye blinks (e.g., blinking the same eye two times within a predetermined threshold time-period), double eye blinks (e.g., blinking both eyes concurrently), or any other suitable facial gesture that is readily recognizable by the NED device 1404. Although aspects of the techniques described herein are predominantly described in the context of a user performing facial gestures to "hold" a virtual item while dragging and then "release" the virtual item when done dragging, forms of user input other than performing facial gestures are also contemplated. For example, a user may provide voice commands such as "drag virtual item with eye gaze."

As illustrated, the real-world environment 1500 includes a first real object 1504(1) and a second real object 1504(2). For illustrative purposes only, the first real object 1504(1) is illustrated as being a table whereas the second real object 1504(2) is illustrated as being a shelf that is positioned above the table. Furthermore, the virtual item 1502 is shown as being a box. As described above, the NED device 1404 may generate spatial mapping data that defines geometric characteristics of the real-world environment 1500 and, more specifically, the various individual real objects existing therein. The spatial mapping data may define one or more real-world coordinate systems 1506 and some or all of the geometric characteristics of the real-world environment 1500 may be defined with reference to these real-world coordinate systems 1506. In some embodiments, the spatial mapping data may define real-world coordinate systems 1506 on an individual basis for various ones of the real objects 1504. For example, as illustrated, the spatial mapping data that is generated by the NED device 1404 may define physical geometry characteristics for the first real object 1504(1) in relation to a first real-world coordinate system 1506(1) and physical geometry characteristics for the second real object 1504(2) in relation to a second real-world coordinate system 1506(2).

In some embodiments, various visual characteristics of the virtual item 1502 may be defined in relation to a virtual model coordinate system 1508. For example, the virtual item 1502 may be a 3D model that includes multi-dimensional features such as surfaces and/or volumes that are defined via reference to the virtual model coordinate system 1508. In this way, if the virtual model coordinate system 1508 is moved within the real-world environment 1500 via a user's gaze direction movements then the position within the real-world environment at which the virtual item 1502 is rendered will change accordingly. The user may desire to reposition the virtual item 1502 within the real-world environment 1500 for a variety of reasons. For example, as described above, the user may desire to anchor a virtual note to a particular real object 1504 to provide context to other users as to what real object 1504 the note refers to (e.g., the aforementioned industrial machinery may have numerous buttons and without anchoring the virtual note to the broken button appropriate context may be lacking). Accordingly, the user 1402 may provide an indication to the NED device 1404 that he or she desires to move (e.g., drag or otherwise reposition) the virtual item 1502 within the real-world environment 1500.

Figure 15B:
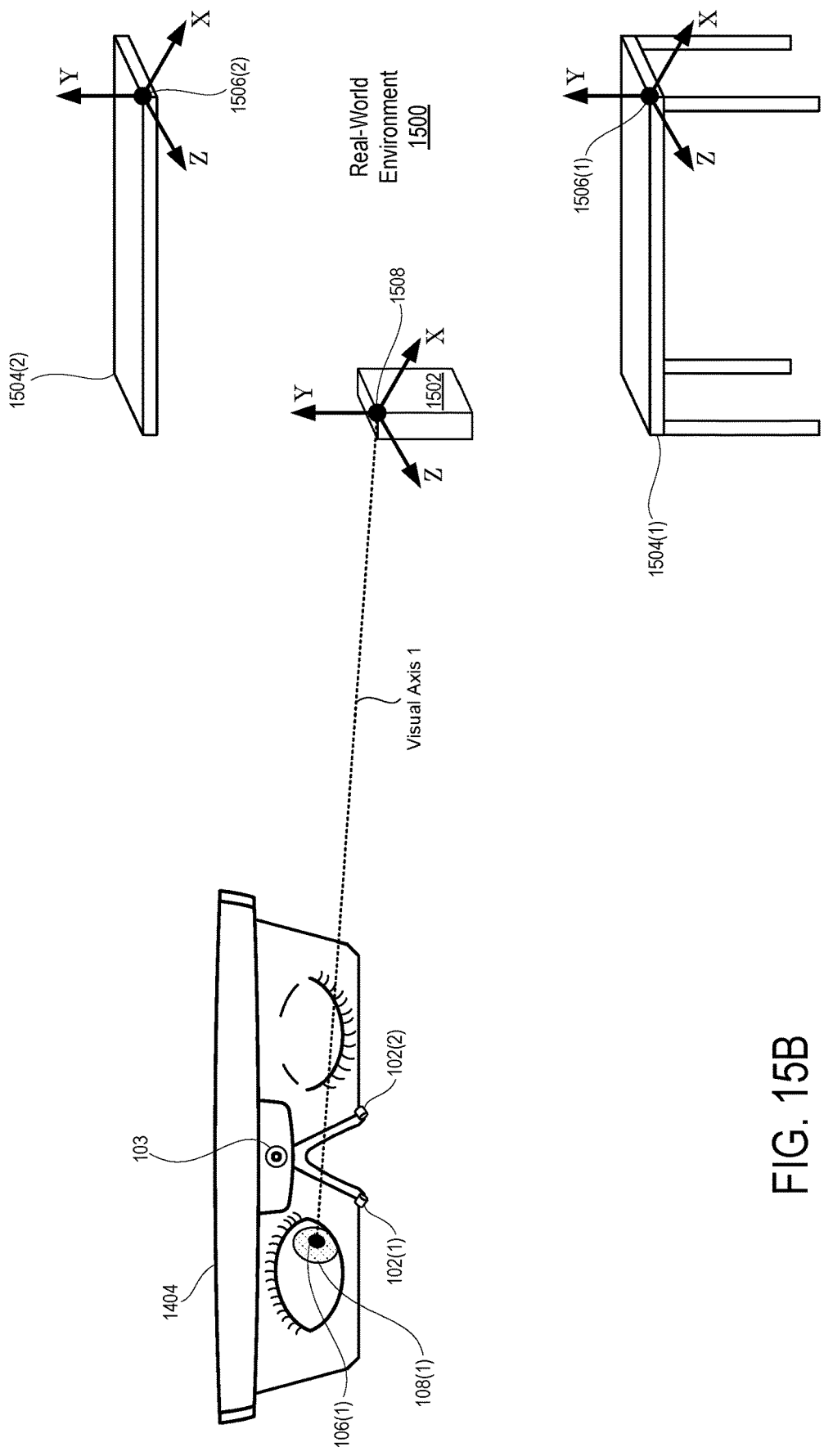
FIG. 15B shows a user providing an indication to the NED device of FIG. 15A that he or she desires to move the virtual item within the real-world environment.

Turning now to FIG. 15B, this drawing is similar to FIG. 15A with the exception that the user has provided the indication that he or she desires to move the virtual item 1502 within the real-world environment 1500. The indication may be provided in the form of a predetermined facial gesture, or any other suitable form. In this illustrated but non limiting example, the predetermined facial gesture is closing a left eye while the gaze direction is focused on the virtual item 1502. It should be appreciated that this is easily analogized to depressing and holding down a left-mouse button to hold onto an item (e.g., a folder, file, application window, etc.) that a cursor graphical element has been placed over in a conventional operating system.

Figure 15C:
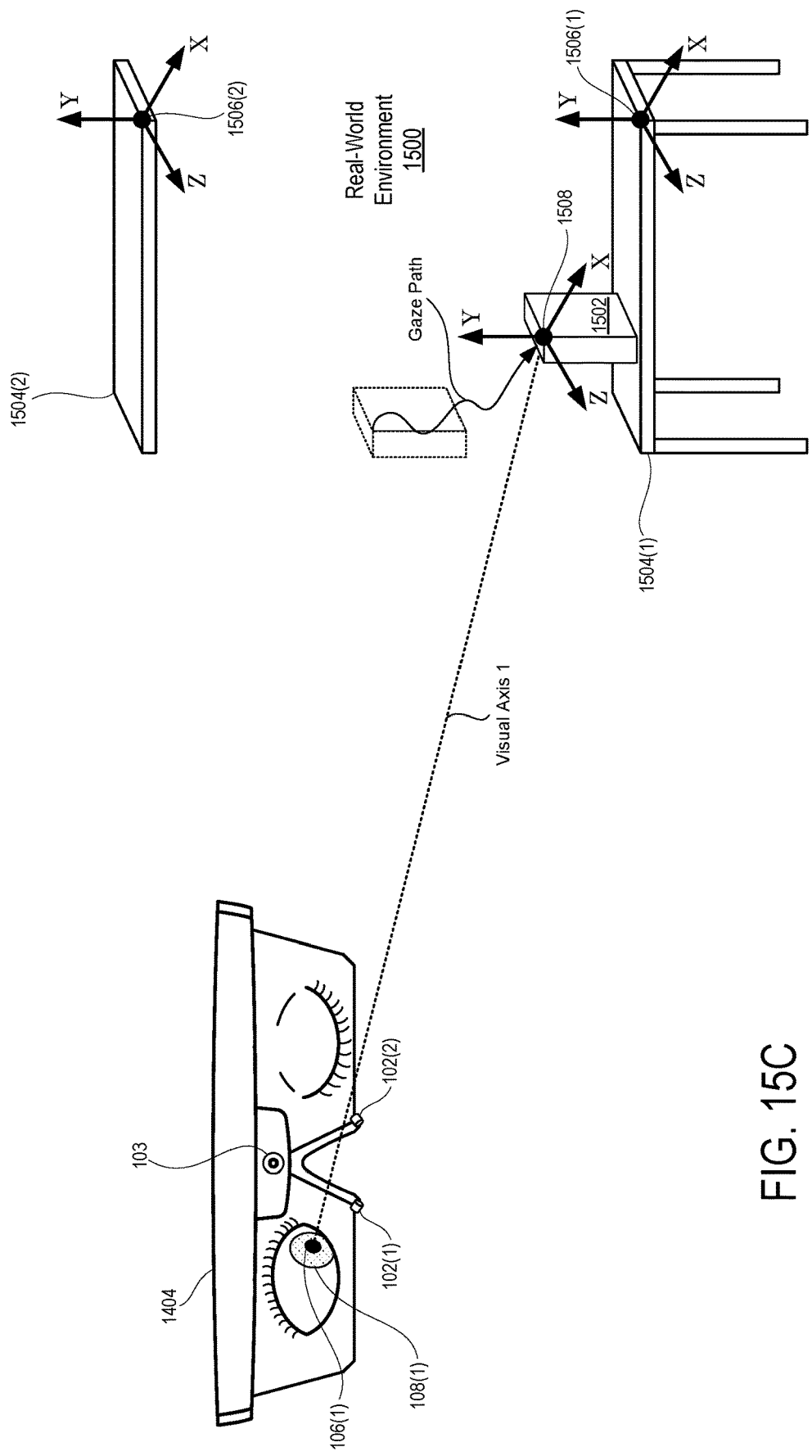
FIG. 15C shows the user moving his or her gaze direction along a gaze path to reposition the virtual item within the real-world environment.

Turning now to FIG. 15C, this drawing is similar to FIG. 15B with the exception that the user has moved his or her gaze direction along a gaze path to reposition the virtual item 1502 within the real-world environment 1500. More specifically, the user 1402 has adjusted his or her gaze direction toward the first real object 1504(1) and by doing so has caused the virtual item 1502 to appear as if it is resting upon the table within the real-world environment 1500.

In some embodiments, the NED device 1404 may select a particular real-world coordinate system 1506 to anchor the virtual item 1502 to based on the gaze direction of the user. For example, as illustrated in FIG. 15C, the first visual axis of the user is directed more toward the first real-world coordinate system 1506(1) than toward the second real-world coordinate system 1506(2). More specifically, the minimum distance between the user's gaze direction (as measured by the optical and/or visual axis) and the first real-world coordinate system 1506(1) is less than the minimum distance between the user's gaze direction and the second real-world coordinate system 1506(2). For purposes of the present discussion, presume that the NED device 1404 has caused the virtual item 1502 to become anchored to the first real-world coordinate system 1506(1) based on the relative relationships between the gaze direction and two or more real-world coordinate systems. Stated alternatively, the NED device 1404 has caused the virtual item 1502 to be rendered within the real-world environment 1500 at a position that is in reference to first real-world coordinate system 1506(1).

Figure 15D:
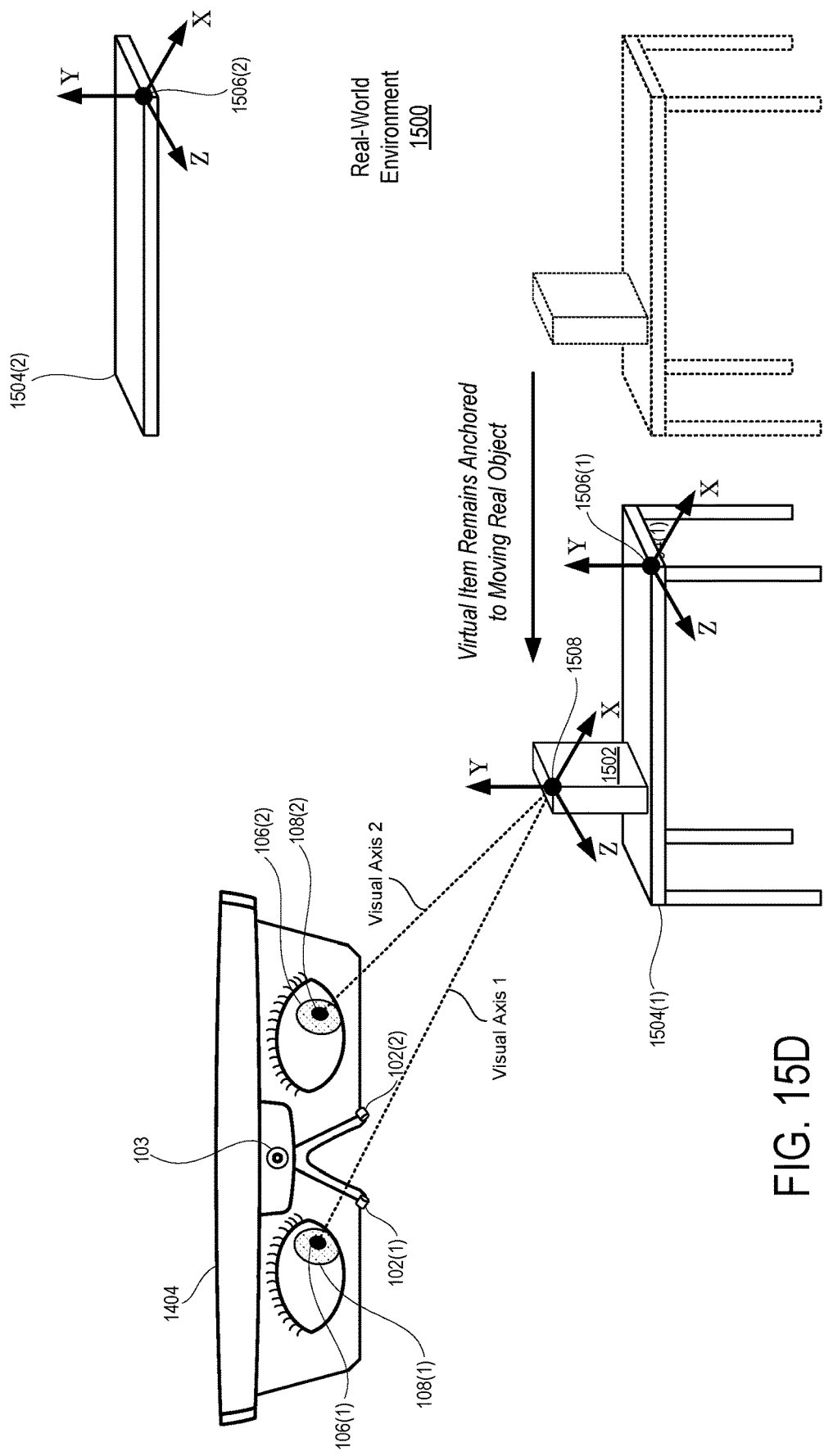
FIG. 15D shows the virtual item moving along with the first real object as a result of being anchored to the first real-world coordinate system based on the user's gaze direction as shown in FIG. 15C.

Turning now to FIG. 15D, the virtual item 1502 is shown to be moving along with the first real object 1504(1) as a result of being anchored to the first real-world coordinate system 1506(1) based on the user's gaze direction. In this way, the user is enabled to quickly anchor a virtual item to a particular real object simply by dragging the virtual item toward the particular real object with deliberate movements of his or her gaze direction. Then, from the augmented perspective of the user and/or other users wearing other NED devices, the virtual item will remain positionally tied to the particular real object even as that object moves around throughout the real-world environment 1500.

Figure 15E:
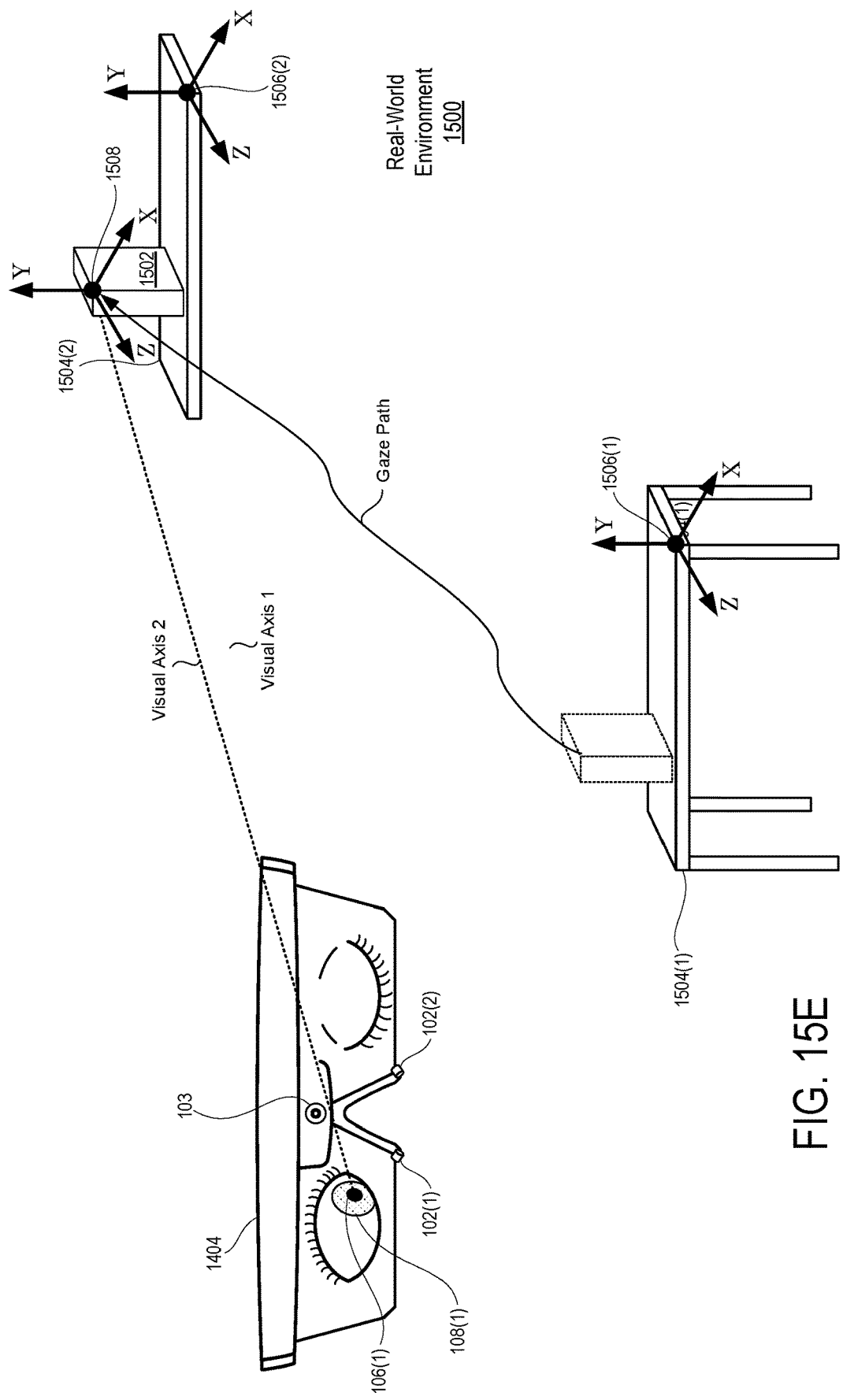
FIG. 15E shows the user dragging the virtual item along a gaze path from a first location within the real-world environment where the virtual item is anchored to the first real-world coordinate system to a second location that is closer to the second real-world coordinate system.

Turning now to FIG. 15E, the user is shown to drag the virtual item 1502 along a gaze path from a first location within the real-world environment 1500 where the virtual item 1502 is anchored to the first real-world coordinate system 1506(1) to a second location that is closer to the second real-world coordinate system 1506(2). In some embodiments, the NED device 1404 may dynamically update which real-world coordinate system 1506 the virtual item 1502 is being positionally referenced from. For example, as illustrated the user is shown to drag the virtual item 1502 with their eye gaze so that the virtual item 1502 is no longer closest to the first real-world coordinate system 1506(1) but rather is closer to the second real-world coordinate system 1506(2). In doing so, the user causes the NED device 1404 to break the positional reference of the virtual item 1502 to the first real-world coordinate system 1506(1) and generate a new positional reference of the virtual item 1502 to the second real-world coordinate system 1506(2).

In some embodiments, the NED device 1404 may be configured to provide real-time visual feedback to the user 1402 in response to a current direction of the user's eye gaze and/or a current convergence point of the user's visual axis. For example, in response to the user 1402 focusing upon any individual items (real or virtual), some visual feedback may be provided such as, for example, changing a visual appearance of the focused upon item to distinguish the item from other items. As a specific but non-limiting example, the NED device may currently be rendering a plurality of different virtual item—each of which the user may reposition in accordance with the techniques described herein. In response to the user focusing onto a particular virtual item and then providing an input to "hold" onto the particular virtual item for dragging purposes, the NED device may respond by adjusting the rendering of the particular virtual item and/or the other "non-selected" virtual items. For example, the NED device may blur the rendering of the other "non-selected" virtual items and/or may brighten the rendering of the selected virtual item.

In some embodiments, the NED device 1404 may provide the user 1402 with real-time visual feedback that intuitively indicates where within the real-world environment and/or at which virtual items the user's current gaze direction is directed at. It will be appreciated that the gaze direction of the user can in a way be analogized to a mouse cursor element of a typical operating system. For example, the user focusing on a specific user interface element (e.g., graphical control element) may be treated similar to the user hovering a mouse cursor over the specific user interface element.

Figure 16:
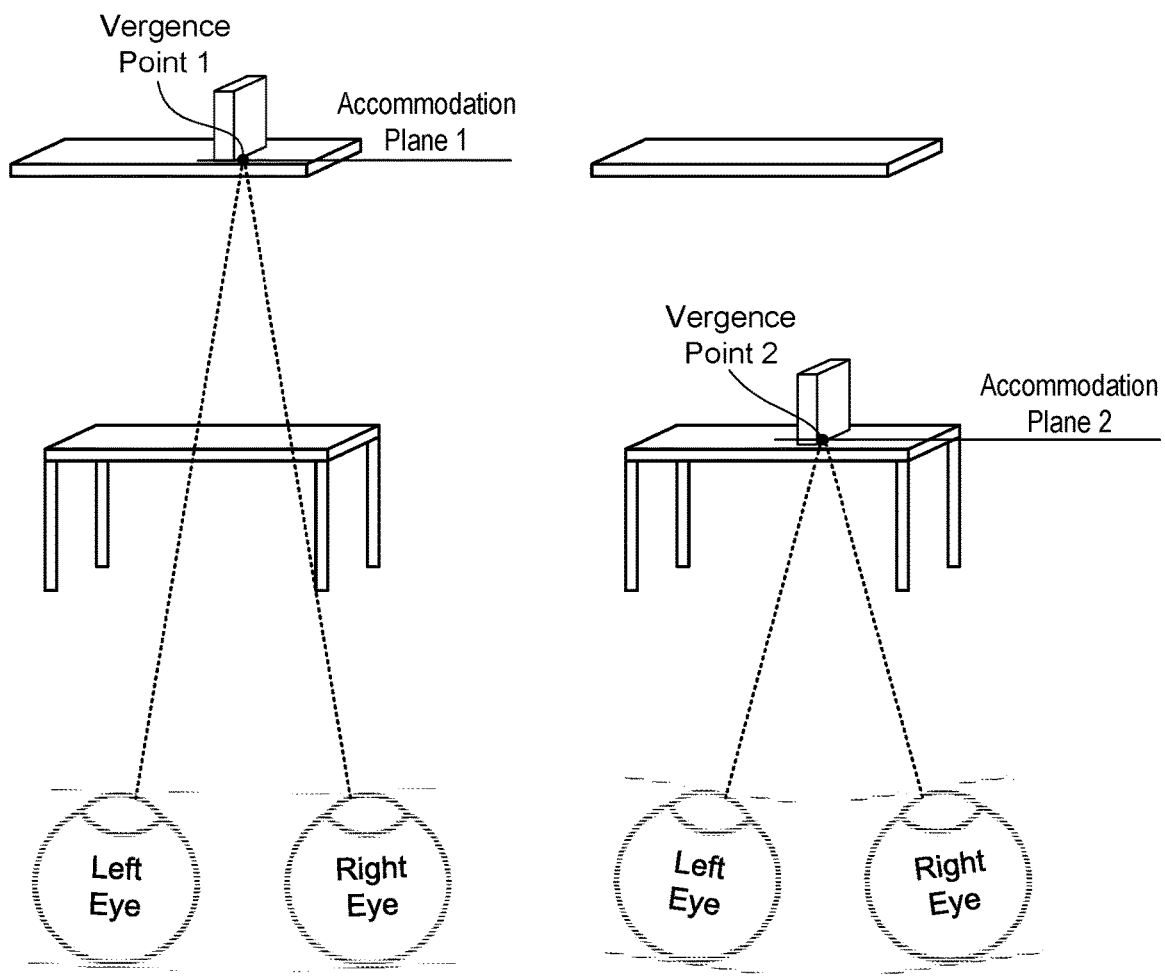
FIG. 16 shows an exemplary environment in which a user may perform vergence movements of the eyes to control a depth at which a virtual item is rendered within a real-world environment.

Turning now to FIG. 16, illustrated is an exemplary environment 1600 in which a user may perform vergence movements of the eyes to control a depth at which a virtual item is rendered within a real-world environment. For example, the user may shift a vergence of the two visual axes (e.g., a focal point) from a first accommodation plane to a second accommodation plane. In response, the NED device 1404 described herein may cause the virtual item to be rendered at a depth corresponding to the accommodation plane which the user's focal point is located. In this way, the user is provided with enhanced control over where within 3D space virtual items are rendered and/or anchored within a real-world environment.

The left side of FIG. 16 shows the focus of the user on a real object at "Accommodation Plane 1." In determining where the user intends to locate the virtual object shown in FIG. 16 (e.g., the box), the NED device may calculate the depth of accommodation plane 1 and then render and/or anchor the virtual object within the real-world environment based on this calculated depth. In contrast, the right side of FIG. 16 shows the focus of the user on a different real object at "Accommodation Plane 2" that is relatively closer to the user than "Accommodation Plane 2." Under circumstances where the user is holding onto the virtual item for eye gaze-based repositioning, the NED device may respond to the change in the user's current accommodation plane by changing the depth at which the virtual item is rendered. In some embodiments, the user changing his or her focal depth from the first accommodation plane to the second accommodation plane causes the NED device 1404 to break a first positional reference of the virtual item to a first real-world coordinate system and generate a new positional reference of the virtual item to the second real-world coordinate system.

Based on the foregoing description of FIGS. 14 through 16, it should be appreciated that the described technologies represent a substantial advancement over conventional NED devices which are unable to receive "hands-free" virtual item dragging capabilities. For example, the NED device 1404 enables users to provide "hands-free" user input instructions to adjust where within a 3D environment (e.g., a virtual environment in which the user's view of a real-world is wholly blocked and replaced with virtual content, or an augmented environment) virtual items are to be rendered. The NED device 1404 is usable in a variety of real-life practical applications that include, but are not limited to, scenarios where users are performing hand intensive tasks that render conventional hand gestures impractical. The disclosed techniques therefore represent a substantial advance toward providing users with "hands-free" control over deeply immersive augmented-reality (AR) content.

Although the concepts herein are predominantly described in relation to a user manipulating a virtual object that is rendered by a NED device with respect to real-world objects, these descriptions are provided for illustrative purposes only. This is because aspects of the concepts described herein can be easily appreciated in such a context. However, it is contemplated and within the scope of the present disclosure that the user may manipulate (e.g., drag-and-drop) virtual items that are being rendered by a NED device with respect other virtual items that are being rendered by the NED display. For example, the technologies described herein may also be used to enable a user to manipulate files and/or folders within a virtually rendered directory structure. For example, a NED device may render various folder items in accordance with a folder-based and/or window-based user interface of a typical operating system. Then, the user may use the techniques described herein to drag files between folders to change the directory locations at which the files are located.

Figure 17:
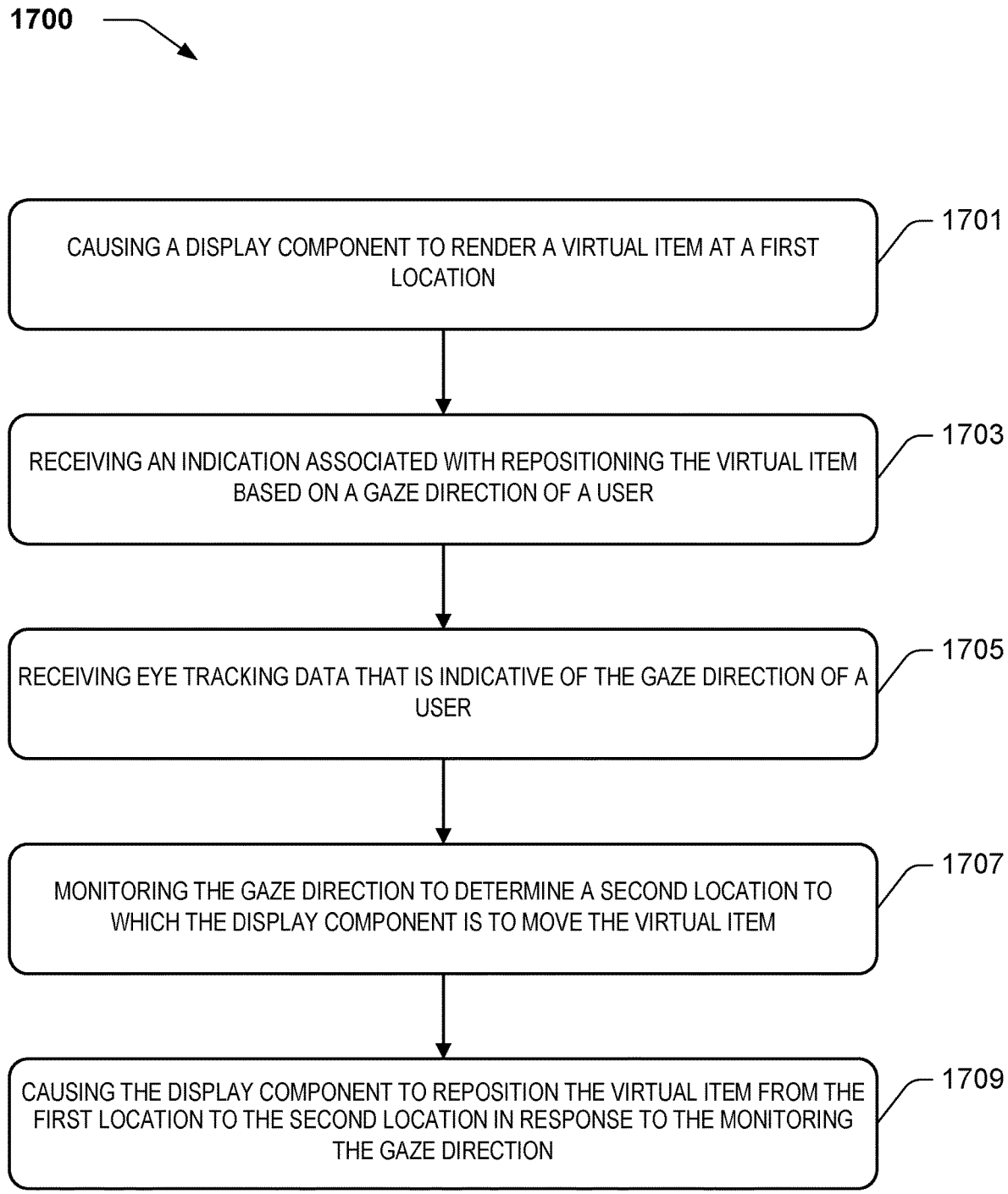
FIG. 17 is a flow diagram of a process to enable a user to adjust a position at which a virtual item is being rendered by "dragging" the virtual item with deliberate and controlled eye movements.

FIG. 17 is a flow diagram of a process 1700 to enable a user to adjust a position at which a virtual item is being rendered by "dragging" the virtual item with deliberate and controlled eye movements.

At block 1701, a computing system causes a display component to render a virtual item at a first location. For example, as shown and discussed in relation to FIG. 15A, a virtual item may be rendered at a default location upon being added to a virtual scene.

At block 1703, the computing system receives an indication that is associated with repositioning the virtual item based on a gaze direction of the user. For example, the user may wish to use deliberate and controlled eye movements to drag the virtual item to a new location.

At block 1705, the computing system receives eye tracking data that is indicative of the gaze direction of the user. The eye tracking data may be generated by one or more eye tracking systems as described herein. Alternatively, other eye tracking systems whether currently existing or subsequently developed may also be used without departing from the scope of the present invention.

At block 1707, the computing system monitors the user's gaze direction based on the eye tracking data to determine a second location to which the display component is to render the virtual item. For example, as described in relation to FIGS. 15C and 15E, the user may drag the virtual item throughout 3D space of a real-world environment using his or her eye gaze.

At block 1709, the computing system responds to the monitored eye gaze direction by causing the display component to reposition a rendering of the virtual item from the first location to the second location that corresponds to the eye gaze.

EXAMPLE CLAUSES

Example Clause A, a Near-Eye-Display (NED) device, comprising: at least one display component; at least one eye tracking sensor configured to generate eye tracking data associated with at least one eye of a user; one or more processors; and at least one computer storage medium having computer executable instructions stored thereon which are executable by the one or more processors to perform operations that include: causing the at least one display component to render a virtual item at a first location within a field of view of the user; receiving an indication that is associated with repositioning the virtual item away from the first location based on a gaze direction of the user; receiving the eye tracking data from the at least one sensor; monitoring, based on the eye tracking data, the gaze direction of the user to determine a second location within the field of view of the user; and in response to the monitoring the gaze direction, causing the at least one display component to render the virtual item at the second location within a field of view of the user.

Example Clause B, the NED device of Example Clause A, wherein the computer executable instructions are further executable by the one or more processors to perform operations that include: selecting a real-world coordinate system based at least in part on the monitoring the gaze direction; and determining a positional reference between the real-world coordinate system and a virtual item coordinate system based on the gaze direction, the positional reference to anchor the virtual item with respect to the real-world coordinate system.

Example Clause C, the NED device of any one of Example Clauses A through B, further comprising at least one spatial mapping sensor for generating spatial mapping data in association with a real-world environment surrounding the NED device, wherein the second location within the field of view of the user is determined based on the spatial mapping data and the eye tracking data.

Example Clause D, the NED device of any one of Example Clauses A through C, wherein the indication that is associated with repositioning the virtual item away from the first location based on the gaze direction of the user corresponds to a predetermined facial gesture being performed by the user.

Example Clause E, the NED device of any one of Example Clauses A through D, wherein the computer executable instructions are further executable by the one or more processors to perform operations that include: determining a focal depth of the user based at least in part on a first gaze direction of a first eye and a second gaze direction of a second eye; and determining a positional reference between a real-world coordinate system and a virtual item coordinate system based on the focal depth.

Example Clause F, the NED device of any one of Example Clauses A through E, wherein the computer executable instructions are further executable by the one or more processors to perform operations that include: selecting a second real-world coordinate system based at least in part on the monitoring the gaze direction, wherein when the indication is received the virtual item is rendered at the first location based on a first positional reference to a first real-world coordinate system associated with a first real object; and determining a second positional reference between the second real-world coordinate system and the virtual item based on the gaze direction.

Example Clause G, the NED device of any one of Example Clauses A through F, wherein the computer executable instructions are further executable by the one or more processors to perform operations that include replacing the first positional reference with the second positional reference to anchor the virtual item to a second real object.

Example Clause H, the NED device of any one of Example Clauses A through G, wherein the virtual item is a virtual note that becomes anchored to a real object in response to the monitoring the gaze direction.

Example Clause I, a computer-implemented method comprising: causing a display component of a NED device to render a virtual item within a field of view of a user; receiving an indication associated with repositioning the virtual item based on a gaze direction of the user; receiving, from at least one spatial mapping sensor, spatial mapping data associated with a real-world environment surrounding the NED device; receiving, from at least one eye tracking sensor, eye tracking data associated with the gaze direction of the user; determining, based on the gaze direction and the spatial mapping data, a positional reference for the virtual item with respect to the real-world environment surrounding the NED device; and causing the display component of the NED device to reposition the virtual item within the field of view of the user in accordance with the positional reference.

Example Clause J, the computer-implemented method of Example Clause I, wherein the positional reference is defined in relation to a real-world coordinate system that corresponds to the real-world environment.

Example Clause K, the computer-implemented method of any one of Example Clauses I through J, further comprising selecting the real-world coordinate system, from a plurality of real-world coordinate systems, based at least in part on the gaze direction.

Example Clause L, the computer-implemented method of any one of Example Clauses I through K, further comprising: replacing, based on the gaze direction and the spatial mapping data, a first positional reference of the virtual item to a first real-world coordinate system with a second positional reference of the virtual item to a second real-world coordinate system.

Example Clause M, the computer-implemented method of any one of Example Clauses I through L, wherein at least one of the first real-world coordinate system or the second real-world coordinate system is associated with a real object that is represented within the spatial mapping data.

Example Clause N, the computer-implemented method of any one of Example Clauses I through M, further comprising: determining a focal depth of the user based at least in part on the eye tracking data; and causing the display component of the NED device to reposition the virtual item in accordance with the focal depth.

Example Clause O, the computer-implemented method of any one of Example Clauses I through N, wherein the indication associated with repositioning the virtual item corresponds to a combination of the gaze direction being directed at the virtual item and a predetermined user input.

Example Clause P, the computer-implemented method of any one of Example Clauses I through O, wherein the predetermined user input corresponds to at least one of a predetermined facial gesture or an audible command.

Example Clause Q, a computing system, comprising: one or more processors; and at least one computer storage medium having computer executable instructions stored thereon which are executable by the one or more processors to: cause a display component to render a virtual item within a field of view of a user; receive an indication associated with repositioning the virtual item based on a gaze direction of the user; receive, from at least one eye tracking sensor, eye tracking data that indicates the gaze direction of the user; determine, based on the gaze direction, a positional reference for the virtual item with respect to at least one coordinate system; and cause the display component to reposition the virtual item within the field of view of the user in accordance with the positional reference.

Example Clause R, the computing system of any one of Example Clauses Q through Q, wherein the computer executable instructions are further executable by the one or more processors to receive, from at least one spatial mapping sensor, spatial mapping data associated with a real-world environment surrounding a NED device, wherein determining the positional reference for the virtual item is further based on the spatial mapping data.

Example Clause S, the computing system of any one of Example Clauses Q through R, wherein the computer executable instructions are further executable by the one or more processors to: determine a focal depth of the user based at least in part on the eye tracking data; and cause the display component to reposition the virtual item in accordance with the focal depth.

Example Clause T, the computing system of any one of Example Clauses Q through S, wherein the indication associated with repositioning the virtual item corresponds to a combination of the gaze direction being directed at the virtual item and a predetermined user input.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A Near-Eye-Display (NED) device, comprising:
at least one display component;
at least one eye tracking sensor configured to generate eye tracking data associated with at least one eye of a user;
one or more processors; and
at least one computer storage medium having computer executable instructions stored thereon which are executable by the one or more processors to perform operations that include:
causing the at least one display component to render a virtual item at a first location within a field of view of the user;
receiving an indication that the user has performed a predetermined facial gesture that corresponds to a user input command for repositioning the virtual item away from the first location based on a gaze direction of the user;
receiving the eye tracking data from the at least one eye tracking sensor;
monitoring, based on the eye tracking data, the gaze direction of the user to determine a second location within the field of view of the user; and
in response to the indication of the user performing the predetermined facial gesture, causing the at least one display component to dynamically adjust the virtual item from being rendered at the first location to being rendered at the second location within the field of view of the user.

2. The NED device of claim 1, wherein the computer executable instructions are further executable by the one or more processors to perform operations that include:
selecting a real-world coordinate system based at least in part on the monitoring the gaze direction; and
determining a positional reference between the real-world coordinate system and a virtual item coordinate system based on the gaze direction, the positional reference to anchor the virtual item with respect to the real-world coordinate system.

3. The NED device of claim 1, further comprising at least one spatial mapping sensor for generating spatial mapping data in association with a real-world environment surrounding the NED device, wherein the second location within the field of view of the user is determined based on the spatial mapping data and the eye tracking data.

4. The NED device of claim 1, wherein the indication that the user has performed the predetermined facial gesture corresponds to the user blinking a first eye, of the at least one eye, and wherein the gaze direction corresponds to a second eye of the at least one eye.

5. The NED device of claim 1, wherein the computer executable instructions are further executable by the one or more processors to perform operations that include:
determining a focal depth of the user based at least in part on a first gaze direction of a first eye and a second gaze direction of a second eye; and
determining a positional reference between a real-world coordinate system and a virtual item coordinate system based on the focal depth.

6. The NED device of claim 1, wherein the computer executable instructions are further executable by the one or more processors to perform operations that include:
selecting a second real-world coordinate system based at least in part on the monitoring the gaze direction, wherein when the indication is received the virtual item is rendered at the first location based on a first positional reference to a first real-world coordinate system associated with a first real object; and
determining a second positional reference between the second real-world coordinate system and the virtual item based on the gaze direction.

7. The NED device of claim 6, wherein the computer executable instructions are further executable by the one or more processors to perform operations that include replacing the first positional reference with the second positional reference to anchor the virtual item to a second real object.

8. The NED device of claim 1, wherein the virtual item is a virtual note that becomes anchored to a real object in response to the monitoring the gaze direction.

9. A computer-implemented method comprising:
causing a display component of a NED device to render a virtual item within a field of view of a user;
receiving an indication of the user performing a predetermined facial gesture that corresponds to a user input command for repositioning the virtual item based on a gaze direction of the user;
receiving, from at least one spatial mapping sensor, spatial mapping data associated with a real-world environment surrounding the NED device;
receiving, from at least one eye tracking sensor, eye tracking data associated with the gaze direction of the user;
determining, based on the gaze direction and the spatial mapping data, a positional reference for the virtual item with respect to the real-world environment surrounding the NED device; and
responsive to the indication of the user performing the predetermined facial gesture, causing the display component of the NED device to reposition the virtual item within the field of view of the user in accordance with the positional reference.

10. The computer-implemented method of claim 9, wherein the positional reference is defined in relation to a real-world coordinate system that corresponds to the real-world environment.

11. The computer-implemented method of claim 10, further comprising selecting the real-world coordinate system, from a plurality of real-world coordinate systems, based at least in part on the gaze direction.

12. The computer-implemented method of claim 9, further comprising:
replacing, based on the gaze direction and the spatial mapping data, a first positional reference of the virtual item to a first real-world coordinate system with a second positional reference of the virtual item to a second real-world coordinate system.

13. The computer-implemented method of claim 12, wherein at least one of the first real-world coordinate system or the second real-world coordinate system is associated with a real object that is represented within the spatial mapping data.

14. The computer-implemented method of claim 9, further comprising:
determining a focal depth of the user based at least in part on the eye tracking data; and
causing the display component of the NED device to reposition the virtual item in accordance with the focal depth.

15. The computer-implemented method of claim 9, wherein the indication associated with repositioning the virtual item corresponds to a combination of the gaze direction being directed at the virtual item and the predetermined facial gesture that corresponds to the user input command for repositioning the virtual item.

16. The computer-implemented method of claim 15, wherein the predetermined facial gesture corresponds to a predetermined number of blinks within a predetermined period of time.

17. A computing system, comprising:
one or more processors; and
at least one computer storage medium having computer executable instructions stored thereon which are executable by the one or more processors to:
cause a display component to render a virtual item within a field of view of a user;
receive an indication of the user performing a predetermined facial gesture that corresponds to a user input command associated with repositioning the virtual item based on a gaze direction of the user;
receive, from at least one eye tracking sensor, eye tracking data that indicates the gaze direction of the user;
determine, based on the gaze direction, a positional reference for the virtual item with respect to at least one coordinate system; and
responsive to the indication of the user performing the predetermined facial gesture that corresponds to the user input command, cause the display component to reposition the virtual item within the field of view of the user in accordance with the positional reference.

18. The computing system of claim 17, wherein the computer executable instructions are further executable by the one or more processors to receive, from at least one spatial mapping sensor, spatial mapping data associated with a real-world environment surrounding a NED device, wherein determining the positional reference for the virtual item is further based on the spatial mapping data.

19. The computing system of claim 18, wherein the computer executable instructions are further executable by the one or more processors to:
determine a focal depth of the user based at least in part on the eye tracking data; and
cause the display component to reposition the virtual item in accordance with the focal depth.

20. The computing system of claim 17, wherein the indication associated with repositioning the virtual item corresponds to a combination of the gaze direction being directed at the virtual item and a predetermined user input.

* * * * *